(12) United States Patent
Zhang et al.

(10) Patent No.: US 11,109,425 B2
(45) Date of Patent: Aug. 31, 2021

(54) BLUETOOTH LOW ENERGY BACKED SMART LIGHTING SYSTEM

(71) Applicant: LEDVANCE LLC, Wilmington, MA (US)

(72) Inventors: Shiyong Zhang, Boxborough, MA (US); Aaron Ganick, Boxford, MA (US)

(73) Assignee: LEDVANCE LLC, Wilmington, MA (US)

( * ) Notice: Subject to any disclaimer, the term of this patent is extended or adjusted under 35 U.S.C. 154(b) by 34 days.

(21) Appl. No.: 16/111,297

(22) Filed: Aug. 24, 2018

(65) Prior Publication Data

US 2020/0068627 A1    Feb. 27, 2020

(51) Int. Cl.
| | | |
|---|---|---|
| H04W 76/10 | (2018.01) | |
| H04W 4/80 | (2018.01) | |
| H05B 45/00 | (2020.01) | |
| H05B 47/19 | (2020.01) | |
| F21K 9/232 | (2016.01) | |

(Continued)

(52) U.S. Cl.
CPC ............. *H04W 76/10* (2018.02); *H04W 4/80* (2018.02); *H05B 45/00* (2020.01); *H05B 47/19* (2020.01); *F21K 9/232* (2016.08); *F21V 5/04* (2013.01); *F21V 15/01* (2013.01); *F21Y 2115/10* (2016.08); *H04W 84/12* (2013.01); *H04W 84/16* (2013.01)

(58) Field of Classification Search
CPC ..... H04W 76/10; H04W 88/06; H04W 84/18; H04W 4/80; H04W 84/16; H04W 84/12; F21K 9/232; F21Y 2115/10; H05B 47/125; H05B 47/11; H05B 45/00; H05B 47/19; F21V 23/045; F21V 5/04; F21V 15/01

See application file for complete search history.

(56) References Cited

U.S. PATENT DOCUMENTS 9,497,836 B2   11/2016   Vangeel
9,516,725 B2   12/2016   Schroder
(Continued)

OTHER PUBLICATIONS

Franz Dugand, "Bluetooth Smart and ZigBee: If you can't beat them, join them", website "Embedded Computing Design", Sep. 21, 2015. Web address: http://www.embedded-computing.com/embedded-computing-design/bluetooth-smart-and-zigbee-if-you-cant-beat-them-join-them#.

*Primary Examiner* — Gregory B Sefcheck
*Assistant Examiner* — Joshua Smith
(74) *Attorney, Agent, or Firm* — Tutunjian & Bitetto PC

(57) ABSTRACT

A lighting control system that includes a first transceiver in a controller device for IEEE 802 connection to a routed mesh network that connects the control device to a luminaire. The routed mesh network is based on an IEEE 802 standard and includes a first WiFi connection of the controller device to a router, a second WiFi connection of the router to a gateway, and a gateway connection from the gateway to the luminaire. The lighting control system further includes a second transceiver based on Bluetooth radio frequency standard, the second network including a first Bluetooth connection between the controller device and the luminaire, and a second network connection between the controller device and the gateway. The lighting control system further includes a data exchange application run from the controller device for sharing address information for the gateway and the luminaires between the first and second network.

9 Claims, 9 Drawing Sheets

(51) Int. Cl.
*H04W 84/16* (2009.01)
*F21V 5/04* (2006.01)
*F21Y 115/10* (2016.01)
*F21V 15/01* (2006.01)
*H04W 84/12* (2009.01)

(56) References Cited

U.S. PATENT DOCUMENTS

| | | | |
|---|---|---|---|
| 9,913,216 B1* | 3/2018 | Deshpande | H04W 28/14 |
| 2006/0046736 A1* | 3/2006 | Pering | H04W 52/0274 |
| | | | 455/452.2 |
| 2014/0308898 A1* | 10/2014 | Lee | H04W 12/003 |
| | | | 455/41.3 |
| 2015/0147067 A1* | 5/2015 | Ryan | H04L 67/12 |
| | | | 398/118 |
| 2016/0044522 A1* | 2/2016 | Ludlow | H04W 24/08 |
| | | | 370/252 |
| 2016/0241445 A1* | 8/2016 | Kim | H04L 41/0893 |
| 2017/0041304 A1* | 2/2017 | Tal | H04L 63/062 |
| 2017/0215261 A1* | 7/2017 | Potucek | H04L 61/2007 |
| 2018/0007634 A1* | 1/2018 | Pereira | H04W 52/0264 |
| 2018/0206096 A1* | 7/2018 | Sharma | H04W 4/80 |
| 2018/0279158 A1* | 9/2018 | Choi | H04W 28/0236 |
| 2018/0359327 A1* | 12/2018 | Romanov | H04W 4/12 |
| 2019/0104384 A1* | 4/2019 | Abou-Rizk | H04W 4/023 |
| 2019/0226646 A1* | 7/2019 | Dvash | F21K 9/238 |

* cited by examiner

BLUETOOTH LOW ENERGY BACKED SMART LIGHTING SYSTEM

TECHNICAL FIELD

The present disclosure generally relates to lighting systems, and more particularly to wireless based smart lighting control.

BACKGROUND

Home and professional environments can contain many controllable lighting devices for creation of ambient, atmosphere, accent or task lighting. These controllable lighting devices are often connected and controlled via a network, which can be wireless. These lighting devices can be controlled individually or in groups via a wireless based smart lighting control.

SUMMARY

In one aspect, a lighting network control system is provided that employs two networks, e.g., a first network based on the IEEE 802 standard, and a second network based on the Zigbee standard. In one embodiment, the lighting control system includes a first transceiver in a controller device for IEEE 802 connection to a routed mesh network that connects the mobile computing device to a luminaire. The routed mesh network is based on an IEEE 802 standard and includes a first WiFi connection of the controller device to a router, a second WiFi connection of the router to a gateway, and a gateway connection from the gateway to the luminaire. The lighting control system further includes a second transceiver based on Bluetooth radio frequency standard, the second network including a first Bluetooth connection between the controller device and the luminaire, and a second network connection between the controller device and the gateway. The lighting control system further includes a data exchange application run from the controller device for sharing address information for the gateway and the luminaires between the first and second network. In some embodiments, the first network based on the IEEE 802 standard is a Zigbee network. In some embodiments, the second network base on Bluetooth radio frequency standard is Bluetooth BLE.

In another aspect, a lamp is provided that includes capabilities to network with both networks based on both the IEEE 802 standard, i.e., Zigbee standard, and the Bluetooth BLE standard. In one embodiment, the lamp includes a housing including a body and a lens; and a light source positioned within the housing to emit light through the lens, wherein the light source includes at least one light emitting diode (LED). The lamp also includes driving electronics to power the light source and a microcontroller to actuate the driving electronics. Commands are received at the microcontroller through a communication module including a first transceiver for IEEE 802 based connection to a routed mesh network, and a second transceiver for connection for a Bluetooth based network connection.

In another aspect, a method of setting up a lighting system is provided that includes providing a first network including a WIFE router and a gateway to provide for connection to a luminaire over a routed mesh network based on an IEEE 802. standard. A controller device including a data exchange application and a Bluetooth based terminal connects to at least one of the luminaire and the gateway to receive address information. The controller device uses the address information to connects to the luminaire using the first network to provide a routed mesh network based on the IEE 802 standard over the WIFE router and the gateway.

In another aspect, a method of controlling a lighting network is provided in which the system includes a Bluetooth based network to back up a routed mesh network based on the IEEE 802 standard. In some embodiments, the method of controlling the lighting network includes establishing a first connection pathway for a control device to a luminaire over a first network including a routed mesh network based on an IEEE 802 standard, wherein the first network includes a WIFI router and a gateway to the luminaire. The method also establishes a second connection pathway for the control device to the luminaire over a second network based on Bluetooth radio frequency standard, the second network including a Bluetooth connection between the control device and the luminaire. The method further includes controlling connectivity of the control device to the luminaire over at least one of the first network and the second network with the control device. The control device connects to the luminaire over one of the first network and the second network that has a higher connection performance.

These and other features and advantages will become apparent from the following detailed description of illustrative embodiments thereof, which is to be read in connection with the accompanying drawings.

BRIEF DESCRIPTION OF THE DRAWINGS

The following description will provide details of embodiments with reference to the following figures wherein.

DETAILED DESCRIPTION

Figure 1:
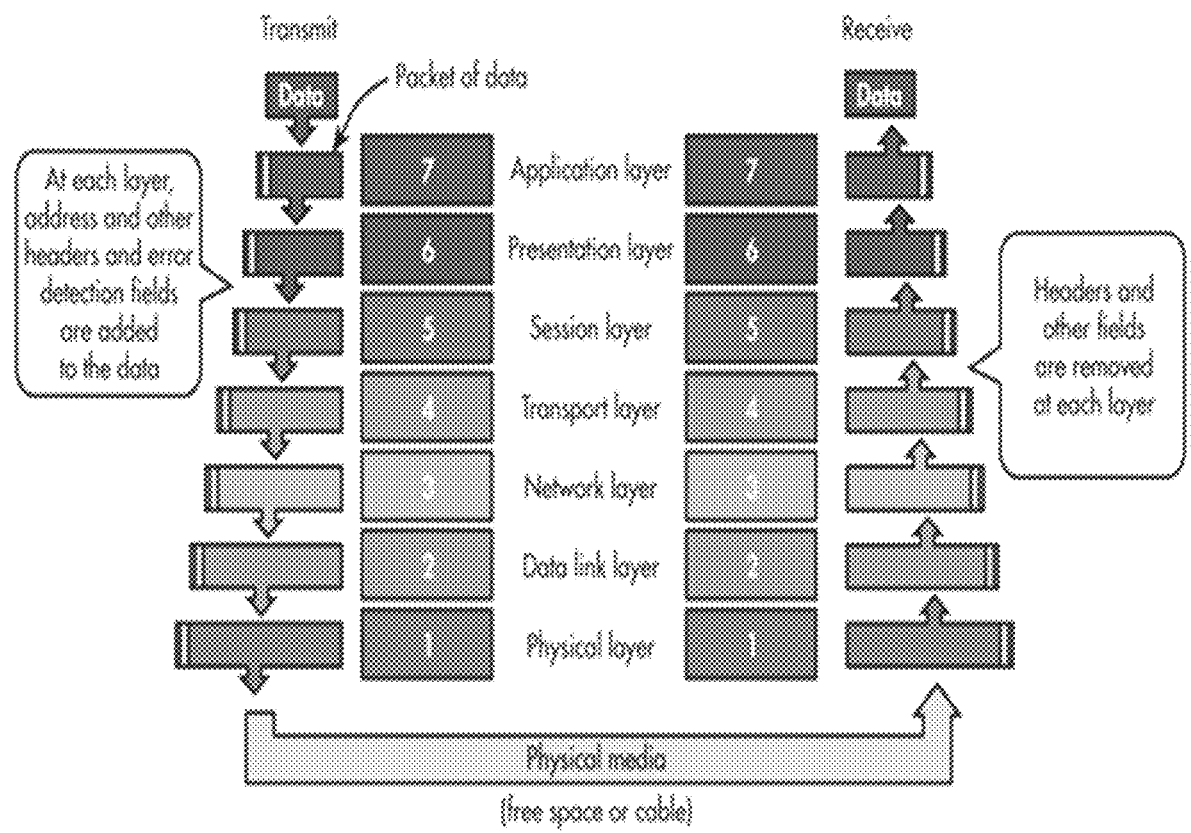
FIG. 1 is a block diagram of an Open Systems Interconnection (OSI) model of network operation, in which the 802.15.4 standard defines the physical layer (PHY) and media access control (MAC) layer.

Reference in the specification to "one embodiment" or "an embodiment" of the present invention, as well as other variations thereof, means that a particular feature, structure, characteristic, and so forth described in connection with the embodiment is included in at least one embodiment of the present invention. Thus, the appearances of the phrase "in one embodiment" or "in an embodiment", as well any other variations, appearing in various places throughout the specification are not necessarily all referring to the same embodiment.

Zigbee technologies, and similar standards based on the IEEE 802 standard for networking, can be used for wireless based smart lighting control. A normal end user employing lamps in combination with Zigbee and WiFi systems employs a WiFi router and a Zigbee gateway to reach Zigbee lighting devices. It has been determined that the zig zag arrangement that results from the connectivity of a mobile computing device to a WiFi router, the connectivity of the WiFi router to the Zigbee gateway, and the connectivity of the Zigbee gateway to the lighting devices can cause a number of difficulties and reliability issues. For example, the aforementioned arrangement can cause frustration during the initial setup stage of the network, as the network addresses for each of the interfaces needs to be recognized for interconnectivity. Additionally, any interruptions in the WiFi service causes interruptions in control, which in some instances may require that the entire system be set up again, i.e., re-initiated. These types of disadvantages result in bad user experiences, and low levels of customer satisfaction, which can obstruct market growth.

Bluetooth Low Energy (BLE) (aka "Bluetooth smart") is another standard in the wireless smart control business. Bluetooth low energy (BLE) is generally packaged with Bluetooth classic. BLE can be found in a majority of smart terminal devices generally beginning with the inception of BLE. If a smart lighting device has BLE designed into it, it can be controlled by smart terminal devices of the same generation directly. BLE can provide for a direct "point to point" connection between a mobile computing device, or other end user terminal device, and controllable peripheral devices, such as lamps. As is described throughout the present disclosure, adding a BLE network to a network based on the IEEE 802 standard, e.g., a routed mesh network including WiFi routers and Zigbee gateways, can overcome some of the difficulties that are inherent in the network based on the IEEE 802 standard. For example, the BLE network can be used to obtain the wireless network addresses for the peripheral devices, i.e., lighting devices and gateway devices, and that information can be used for the start up, i.e., initialization, of the network based on the IEEE 802 standard, e.g., a routed mesh network including WiFi routers and Zigbee gateways. Further, when the network based on the IEEE 802 standard, e.g., a routed mesh network including WiFi routers and Zigbee gateways, has connectivity issues, the BLE network can assume the connectivity requirements.

Further, by teaming a BLE network with a network based on the IEE 802 standard, e.g., a routed mesh network including WiFi routers and Zigbee gateways, the disadvantages of BLE networks can be minimized. For example, BLE is not as scalable as a network based on the IEE 802 standard. Due to scalability issues, BLE is more suitable for residential applications, while the network based on the IEE 802 standard is more suitable for commercial applications. In some examples, if a smart terminal moves out of range for BLE connectivity, the connection can be restored using the network based on the IEE 802 standard.

In some embodiments, the present disclosure provides mobile computing devices, i.e., controllers, that can interact with the above mentioned networks to provide a lighting network. In some embodiments, the present disclosure provides lamps (also referred to luminaires) that include light emitting diode (LED) light sources that can be controlled by a network provided through both IEEE 802 standard, which may include Zigbee gateways, as well as Bluetooth based networks. Methods are also described for providing lighting networks using both IEEE 802 standard, which may include Zigbee gateways, as well as Bluetooth based networks. The methods, controllers and lamp structures that are provided herein are now describe with more detail with reference to FIGS. 1-12.

In some embodiments, the control systems, lamp structures and methods that are described herein interact with two networks, e.g., a first network based on the IEEE 802 standard, and a second network based on the Zigbee standards, as depicted in FIGS. 1-12. In one embodiment, the lighting system includes a first network comprising a routed mesh network connecting a mobile computing device to a luminaire, the first network based on an IEEE 802 standard, the mobile computing device having a first WiFi connection of the first network to a router, the router having a second WiFi to a gateway, and the gateway having a gateway connection to the luminaire.

The first network can be based upon IEEE 802.11, which is for wireless LANs (WLANs), also known as WiFi. The 802.15 group of standards specifies a variety of wireless personal area networks (WPANs) for different applications. For instance, 802.15.1 is Bluetooth, 802.15.3 is a high-data-rate category for ultra-wideband (UWB) technologies, and 802.15.6 is for body area networks (BAN).

The 802.15.4 category is probably the largest standard for low-data-rate WPANs. It has many subcategories. The 802.15.4 category was developed for low-data-rate monitor and control applications and extended-life low-power-consumption uses. The basic standard with the most recent updates and enhancements is 802.11.5.4a/b, with 802.15.4c for China, 802.15.4d for Japan, 802.15.4e for industrial applications, 802.15.4f for active (battery powered) radio-frequency identification (RFID) uses, and 802.15.4g for smart utility networks (SUNs) for monitoring the Smart Grid. All of these special versions use the same base radio technology and protocol as defined in 802.15.4a/b.

Referring to FIG. 1, the 802.15.4 standard defines the physical layer (PHY) and media access control (IAC) layer of the Open Systems Interconnection (OSI) model of network operation. The PHY defines frequency, power, modulation, and other wireless conditions of the link. The MAC defines the format of the data handling. The remaining layers define other measures for handing the data and related protocol enhancements including the final application.

Figure 2:
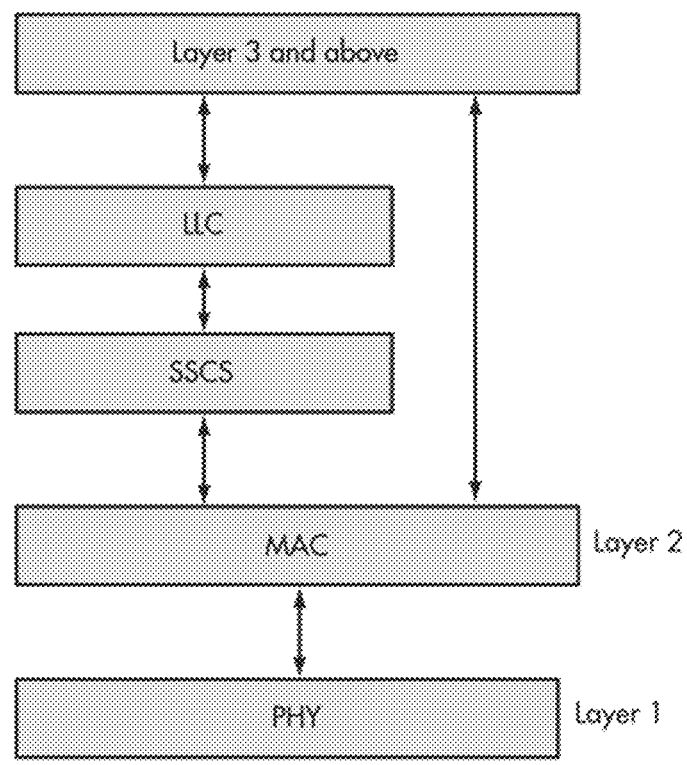
FIG. 2 is a block diagram illustrating the layer 1 and layer 2 details of the IEEE 802.15.4 network standard.

FIG. 2 shows the layer 1 and layer 2 details of 802.15.4. The 802.15.4 standard uses only the first two layers plus the logical link control (LLC) and service specific convergence sub-layer (SSCS) additions to communicate with all upper layers as defined by additional standards. The goal of the standard is to provide a base format to which other protocols and features could be added by way of the upper layers (layers 3 through 7). While three frequency assignments are available, the 2.4-GHz band is by far the most widely used. Most available chips and modules use this popular ISM band.

The standard uses direct sequence spread spectrum (DSSS) modulation. It is highly tolerant of noise and interference and offers coding gain to improve link reliability. Standard binary phase-shift keying (BPSK) is used in the two low-speed versions, while offset-quadrature phase-shift keying (O-QPSK) is used for the higher-data-rate version. O-QPSK has a constant wave envelope meaning that more efficient non-linear power amplification techniques can be used to minimize power consumption.

With regard to channel access, 802.15.4 uses carrier sense multiple access with collision avoidance (CSMA-CA). This multiplexing approach lets multiple users or nodes access the same channel at different times without interference. Most transmissions are short packets that occur infrequently for a very low duty cycle (<1%), minimizing power consumption. The minimum power level defined is −3 dBm or 0.5 mW. Most modules use 0 dBm or 1 mW. However, some 20-dBm or 100-mW modules are available.

Transmission range varies considerably depending on the nature of the path that must for the most part be line of sight (LOS). Transmit power level and receiver sensitivity are also factors. Under the best conditions the range can be as great as 1000 meters with a clear outdoor path. Most applications cover a shorter range of 10 to 75 meters.

With regard to networking capability, 802.15.4 defines two topologies. One of them is a basic star. All communications between nodes must pass through the central coordinator node. A basic peer-to-peer (P2P) topology is also defined. Any device may then talk to any other device. This basic topology may be expanded into other topologies in the upper network layers, such as the popular mesh topology. In a mesh network, each node in a peer-to-peer network also functions as a router. This routing layer allows you to directly address nodes to which you are not directly connected, because intermediate nodes will pass the message along until it reaches the target node.

Figure 3:
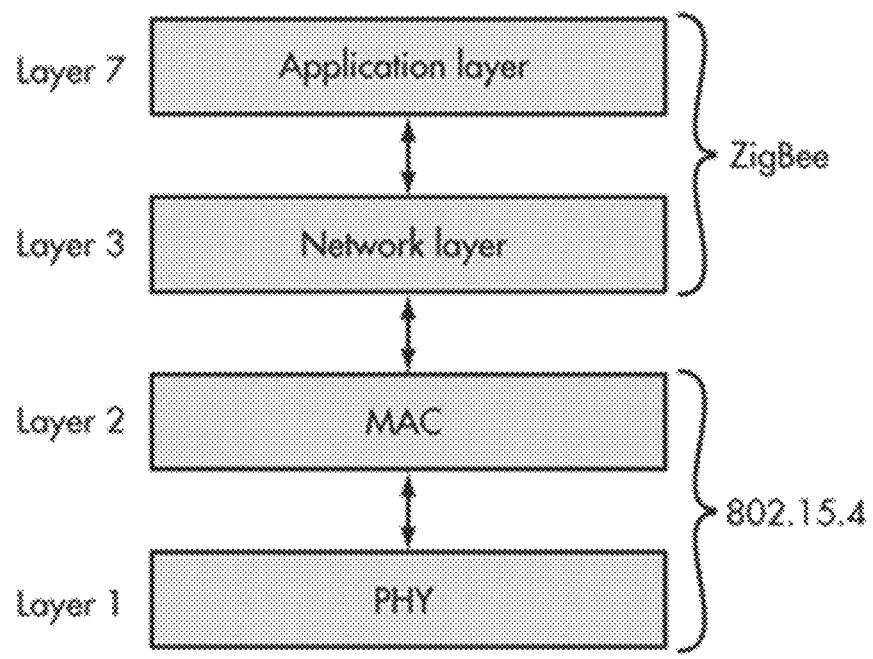
FIG. 3 is a block diagram illustrating the modifications to the IEEE 802.14.4 for providing a ZigBee interface.

ZigBee is an enhancement to the 802.15.4 standard. Zigbee uses layers 3 and 4 to define additional communications features, as depicted in FIG. 3. These enhancements include authentication with valid nodes, encryption for security, and a data routing and forwarding capability that enables mesh networking. The ZigBee protocol is defined by layer 3 and above. It works with the 802.15.4 layers 1 and 2. Layer 7 may be an upper-layer software addition that implements some special uses for ZigBee. Some of these applications include: building automation for commercial monitoring and control of facilities, remote control (RF4CE or RF for consumer electronics), smart energy for home energy monitoring, health care for medical and fitness monitoring, home automation for control of smart homes, input devices for keyboards, mice, touch pads, wands, etc., light link for control of LED lighting, retail services for shopping related uses, telecom services, and network services related to large mesh networks. Although the present disclosure provides examples for ZigBee compatible lamps, the present disclosure is not limited to only this example, as any of the aforementioned applications for ZigBee is suitable for use with the controls and methods described herein.

Figure 4:
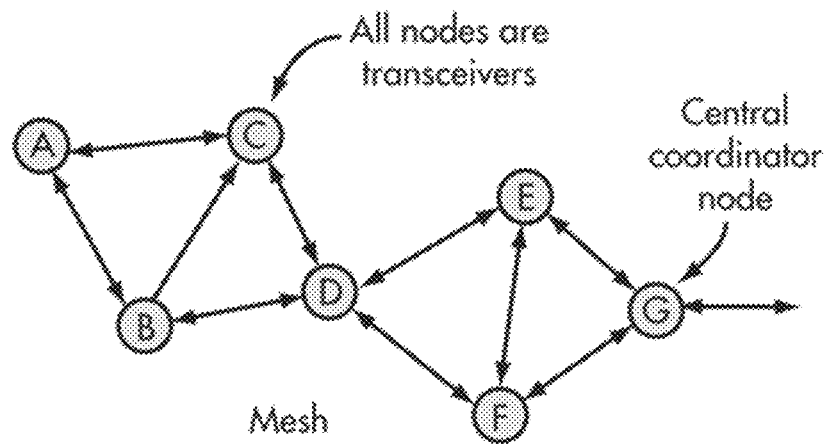
FIG. 4 is an illustration of a mesh network as employed in an IEEE 802 type standard.

Referring to FIG. 4, ZigBee is suitable for wireless sensor networks using the mesh topology. The main benefit of the mesh topology is that any node can communicate with any other node, if not directly if within range, but indirectly by relaying the transmission through multiple additional nodes. The network then can spread out over a larger area. Furthermore, it increases network reliability as it still functions even if one node is disabled. There are usually alternate paths through the network to sustain a connection. For example, if node A wishes to communicate with node G, it can relay data through nodes C and E. If node C fails, another path is via nodes B, D, and E ZigBee mesh networks are self-configuring and self-healing. The mesh topography can be routed mesh, where individual devices in the network have paths of conversation.

Figure 5:
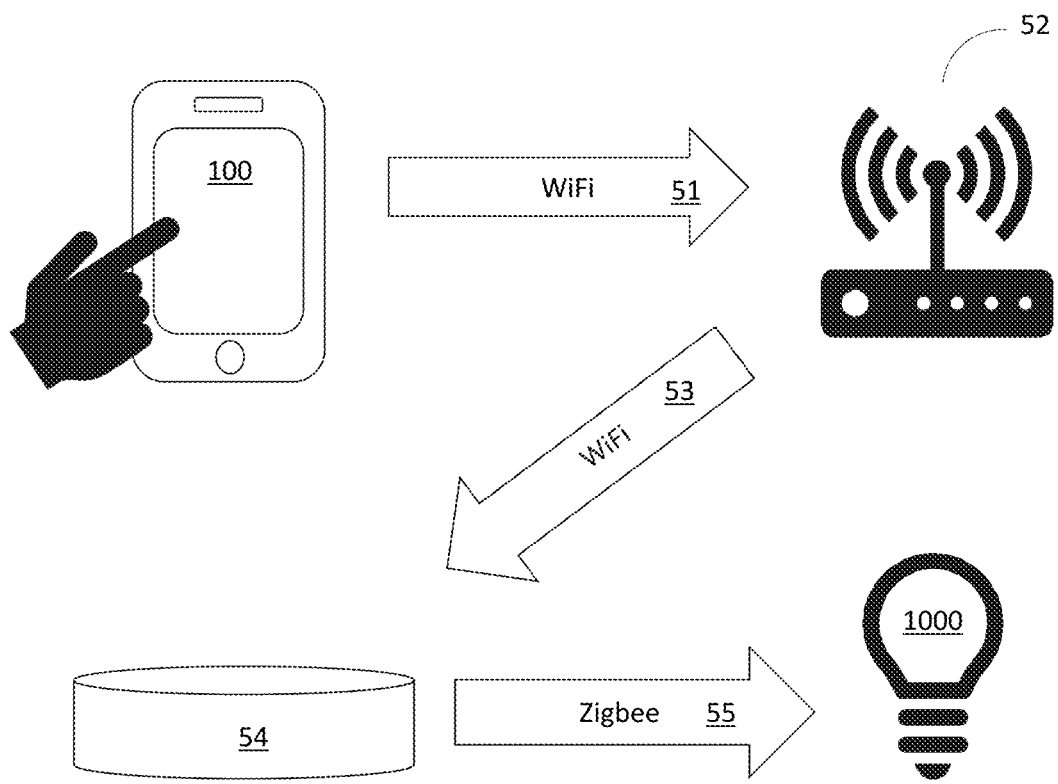
FIG. 5 is an illustration of a routed mesh network that includes WiFi network connections to a router and from the router to a ZigBee gateway, wherein there is a ZigBee network connection between the ZigBee gateway and a lamp, in accordance with one embodiment of the present disclosure.

The ZigBee protocol, e.g., protocol for lighting, is within a routed mesh, as depicted in FIG. 5. FIG. 5 illustrates one example of a first connection pathway from a control device 100 to a luminaire 1000 over a first network including a routed mesh network based on an IEEE 802 standard. As illustrated in FIG. 5, the routed mesh that employs the IEEE 802 standard can includes a first. WiFi connection 51 of a controller device 100 to a router 53. The controller device 100 may be a mobile computing device, laptop/notebook computer, sub-notebook computer, a tablet, phablet computer; a mobile phone, a smartphone; a personal digital assistant (PDA), a portable media player (PMP), a cellular handset; a handheld gaming device, a gaming platform, a wearable computing device, a body-borne computing device, a smartwatch, smart glasses, smart headgear, and a combination thereof. Although FIG. 5 only depicts one control device 100, the present disclosure is not limited to only this example, as any number of control devices 100 may connect with the network. For example, the number of control devices 100 that are connected to the network may be equal to 1, 10, 15, 20, 30, 40, 50, 100 and combinations thereof, as well as any range including one of the aforementioned examples for a lower limit of the range, and one of the aforementioned examples for an upper limit of the range. Further details on the control device 100 are provided in the description of FIG. 8.

The luminaire 1000 may be any lamp that can emit a light source. In some embodiments, the luminaire 1000 may include a light emitting diode (LED) light source. Although FIG. 5 only depicts one luminaire 1000, the present disclosure is not limited to only this example, as any number of luminaires 1000 may connect with the network. For example, the number of luminaires 1000 being controlled may be equal to 1, 5, 10, 15, 20, 30, 40, 50, 100 and combinations thereof, as well as any range including one of the aforementioned examples for a lower limit of the range, and one of the aforementioned examples for an upper limit of the range. Further details on the luminaire 1000 are provided in the description of FIGS. 10-12.

As will be described herein, the control device 100 can issue commands to be transmitted across the networks that are described herein to control peripheral hardware, e.g., luminaires 1000. The commands may include to turn the luminaire "ON", to turn the luminaire "OFF", to change the color of the luminaire 1000; to change the brightness of the luminaire 1000, the change the color temperature of the luminaire 1000; to change the intensity for the color of the luminaire 1000; to change the saturation of the color of the luminaire 1000; and combinations and varieties of the aforementioned command types.

The router 53 is component hardware—a piece of computer/network-related equipment that can connect the routed mesh network based on an IEEE 802 standard to the Internet provided by an internet service provider (ISP). A router 53 can be connected to two or more networks. The router 53 may be a WiFi type router. The WiFi type router may be based on a wireless communication standard, such as 802.11b, 802.11g, 802.11n, as well as variations and combinations thereof. The WiFi type router may operate in two bands. For example, the WiFi router may employ, i.e., receive and transmit, on a 2.4 GHz and 5 GHz. A WiFi type router can transmit and receive data at a rate ranging from 10 Mbps to 350 Mbps, e.g., 100 Mbps. For example, a WiFi type router working on standard 802.11b can provides speeds on the order of 11 Mbps, while a WiFi type router working on standard 802.11g can deliver maximum speeds on the order of 54 Mbps, and a WiFi router working on standard 802.11n can receive and transmit data at speeds reaching 300 Mps or greater.

Referring to FIG. 5, a second WiFi connection 53 extends from the router 52 to the gateway 54. A gateway 54 is a hardware device that acts as a "gate" between two networks. Its the embodiment that is depicted in FIG. 5, the gateway 54 enables traffic to flow in and out of the portion of the mesh network that includes the router 52 and the control devices 100. The portion of the mesh network that includes the router 52 and the control devices 100 may be referred to as the inside portion of the network. The gateway 54 is controlling traffic in and out of the inside portion of the mesh network to a hardware device, e.g., luminaire 1000, that is responsive to commands issued by the control device 100. The gateway 54 is in communication with the hardware devices, e.g., luminaire 1000, across a Zigbee type standard connection 55. ZigBee is an enhancement to the 802.15.4 standard. Zigbee uses layers 3 and 4 to define additional communications features, as depicted in FIG. 3. The connections from the gateway 54 to the hardware devices, e.g., luminaire 1000, is an outside connection.

In some embodiments, a Zigbee gateway, e.g., gateway 54, may include a hardware platform of wireless gateway that is made up of four parts: the controller module, storage module, Zigbee module and Wi-Fi module. The controller is the core of the embedded home gateway, and it uses Zigbee module to configure the Zigbee terminal node and receive the node's data, using Wi-Fi protocol to make connection between gateway and the Internet via Wi-Fi module. The Wi-Fi protocol integrates some network protocols, such as Wi-Fi, TCP/IP, UDP, and DHCP, and reduces the difficulty of the design, and improve the ability of the host controller to deal with other data. In some embodiments, the Wi-Fi module enables high-speed, e.g., 54 Mbps wireless connections. In some embodiments, the Zigbee module may be a coordinator that can start and/or stop the Zigbee network 55. The coordinator can store information about the network, which can include acting as the repository for security keys. The coordinator can function as a router to extend network area coverage, dynamically route around obstacles, and provide backup routes in case of network congestion or device failure. The storage module provides for temporary storage of data in the event that the transmission speed of the Zigbee module becomes a bottleneck for transmission through the gateway 54. Examples of memory that can provide the storage module can include at least one of external 64 MB SRAM, 256 Mbyte DDR and 512 Mbyte NAND flash. Further, the gateway 54 may also include a Bluetooth/BLE transceiver. The ZigBee gateway 54 employs the Bluetooth/BLE transceiver to transmit data and receive data using the Bluetooth/BLE wireless transmission standard.

Referring to FIG. 5, in this instance, the gateway 54 also translates data that is transmitted across the gateway 54 between the inside and outside of the network into a format or protocol recognized by devices within inside portion of the network or the outside portion of the network. For example, data, e.g., a command signal for controlling the luminaire 1000, can first be sent from the control device 100 over the first and second WiFi connections 51, 53 using a. IEEE 802 standard type signal, e.g., IEEE 802.11, and then can be translated from the IEEE 802 standard type signal to a Zigbee standard signal at the gateway 54 for transmission of the data, i.e., command signal for controlling the luminaire 1000, from the gateway 54 to the hardware devices, e.g., luminaire 1000, by the Zigbee type standard connection 55.

In another example, data, e.g., feedback regarding the original command from the luminaire 1000 to the control device 100, can first be sent from the luminaire 1000 over the Zigbee type standard connection 55 by Zigbee standard signal where it is received at the gateway 54. In this example, at the gateway 54, the Zigbee standard signal is converted to an IEEE 802 standard type signal, e.g., EEE 802.11, and then transmitted over the first and second WiFi connections 51, 53 to the control device 100.

Figure 6:
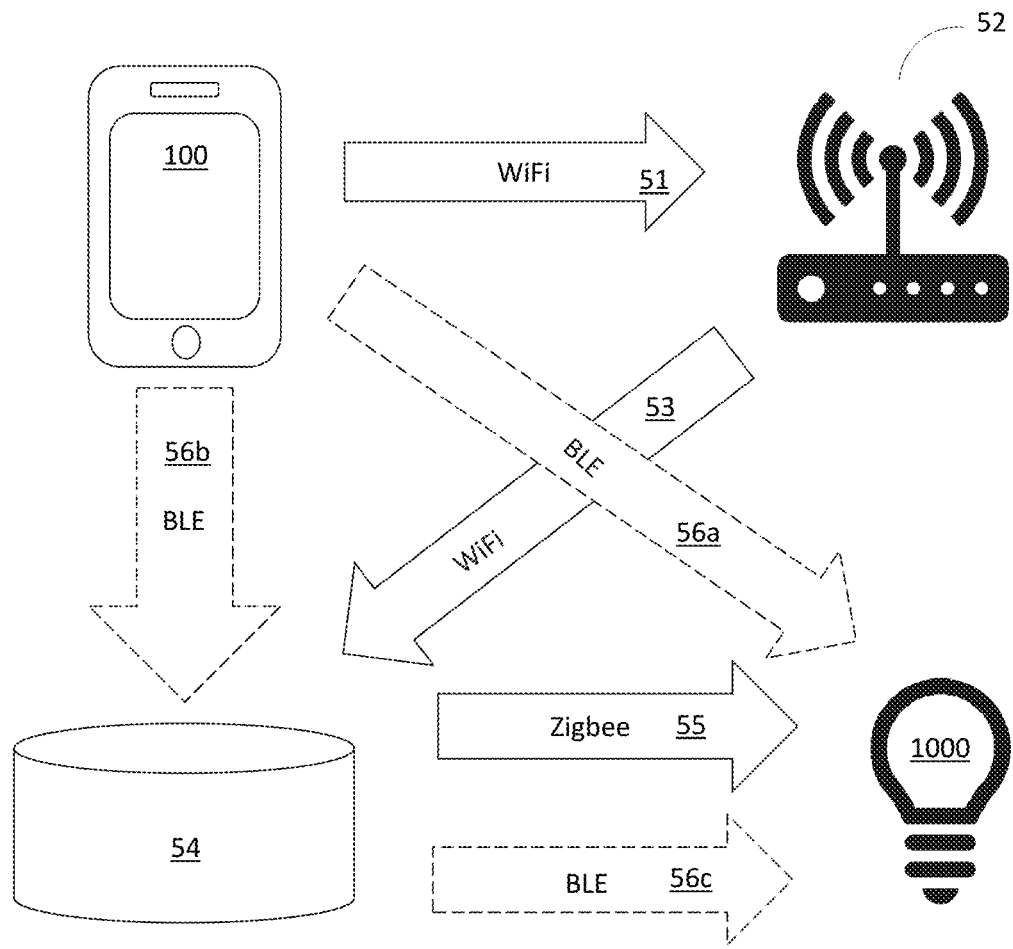
FIG. 6 is an illustration of a first network including the routed mesh network depicted in FIG. 5, in combination with a second network including a Bluetooth connection between the control device and the luminaire, in accordance with one embodiment of the present disclosure.

FIG. 6 is an illustration of a first network including the routed mesh network depicted in FIG. 5, in combination with a second network including a Bluetooth connection 56a, 56b, 56c between the control device 100 and the luminaire 1000. The Bluetooth connection 56a, 56b, 56vc provides a second connection pathway for the control device 100 to the luminaire 1000 over a second network based on Bluetooth radio frequency standard.

In some embodiments, the Bluetooth connection 56a, 56b, 56c is provided by a Bluetooth Low Energy (BLE) (aka "Bluetooth smart") wireless signal standard. BLE can provide for a direct "point to point" connection between a control device 100, or other end user terminal device, e.g., gateway 54, and controllable peripheral devices, such as the luminaires 1000. For example, a first Bluetooth connection 56a, i.e., BLE connection, is from the control device 100 directly to the peripheral device, e.g., luminaire 1000. The first Bluetooth connection 56a can provide that the control device 100 have a "point to point" connection with the peripheral device, such as the luminaire 1000, to allow for the control device 100 to send control commands directly to the peripheral device, e.g., luminaire 1000. A second Bluetooth connection 56b, i.e., BLE connection, is from the control device 100 to the gateway 54 in a "point to point" connection. As will be described in further described below, the second Bluetooth connection 56b may be employed to provide the network address of the gateway to the control device 10. In some embodiments, a third Bluetooth connection 56c, BLE connection, can extend from the gateway 54 directly to the peripheral device, e.g., luminaire 1000. The third Bluetooth connection 56c can provide that the control device 100 have a "point to point" connection with the peripheral device, such as the luminaire 1000.

BLE is supported natively by mobile operating systems iOS, Android, Windows phone and blackberry along with OS X and Windows. In some embodiments, BLE is employed with a star network topology. A star topology is a topology for a Local Area Network (LAN) in which all nodes are individually connected to a central connection point. In some instances, the BLE network can support a mesh topology, however when BLE employs a mesh topology is does so via flooded mesh, as opposed to routed mesh, which is the mesh topology used by Zigbee. There are generally two types of mesh networks. The first is a routed mesh, where individual devices in the network have paths of conversation, ZigBee, a popular wireless protocol for lighting, is a routed mesh. The second type is a flooding mesh, which is possible with BLE, where every device on the network can shout its messages to everything else.

As will be described herein, the combination of the first network, i.e., WiFi and Zigbee type IEEE 802 standard wireless network provided by connections 51, 53, 55, and second network, i.e., Bluetooth, e.g., BLE standard Bluetooth, provided by connections 56a, 56b, 56c, can be employed together to assist in setting up a network of devices, and running the network to assure the highest level of connectivity and performance. The use of the star topology by BLE can mean that that the second network provided by BLE can be dynamic enough to support nodes dropping off and coming onto as they move out and in to range. However, BLE is generally less suited for supporting large network areas, when compared to a routed mesh network, such as provided by the WiFi standards and Zigbee. The range of connectivity for BLE is less than that of routed mesh network that were provided by WiFi standard and Zigbee standard. For example, the range of a BLE network may be on the order of less than 80 meters, whereas a mesh network provided by WiFi standard and Zigbee standard may be on the order of 290 meters. Zigbee supports mesh networking, which purposefully allows a Zigbee network to cover a large network area. In some instances, Bluetooth connectivity, such as BLE, can be best suited for residential networks, whereas the networks based upon the WiFi standards and Zigbee can be best suited for commercial networks.

As will be further described herein, in order to employ the first network, i.e., first and second WiFi connections 51, 53 and Zigbee type connection 55, and the second network, i.e., Bluetooth connections, e.g., BLE connections 56a, 56b, 56c, the control device 100 includes a data exchange application 144 for sharing address information for the gateway and the luminaires between the first and second network. This can be one mechanism to facilitate the initial setup of the network for controlling the luminaires 1000 from the control device 100. For example, the BLE network, i.e., second network of BLE connections 56a, 56b, 56c, can be used to obtain the wireless network addresses for the peripheral devices, i.e., lighting devices 1000 and gateway devices 54, and that information can be used for the start up, i.e., initialization, of the network based on the IEEE 802 standard, e.g., the first network of WiFi connections 51, 53 and Zigbee connection 55 provided by the routed mesh network including WiFi routers 53 and Zigbee gateways 54. In some embodiments, a data exchange application 144 run from the control device 100 provides for sharing address information for the gateway 54 and the luminaires 1000 between the first and second network.

The control device 100 may further include applications to switch between the first network, i.e., first and second WiFi connections 51, 53 and Zigbee type connection 55, and the second network, i.e., Bluetooth connections, e.g., BLE connections 56a, 56b, 56c, to provide the highest performance in communications connectivity from the control device 100 to the luminaires 1000. For example, when the network based on the IEEE 802 standard, e.g., a routed mesh network including WiFi routers and Zigbee gateways, has connectivity issues, the BLE network can assume the connectivity requirements.

Further, by teaming a BLE network 56a, 56b, 56c with a network 51, 53, 55 based on the IEE 802 standard, e.g., a routed mesh network including WiFi routers 52 and Zigbee gateways 54, the disadvantages of BLE networks can be minimized. BLE is not as scalable as a network based on the IEE 802 standard. In some examples, if a smart terminal moves out of range for BLE connectivity, the connection can be restored using the network based on the IEE 802 standard.

Figure 7:
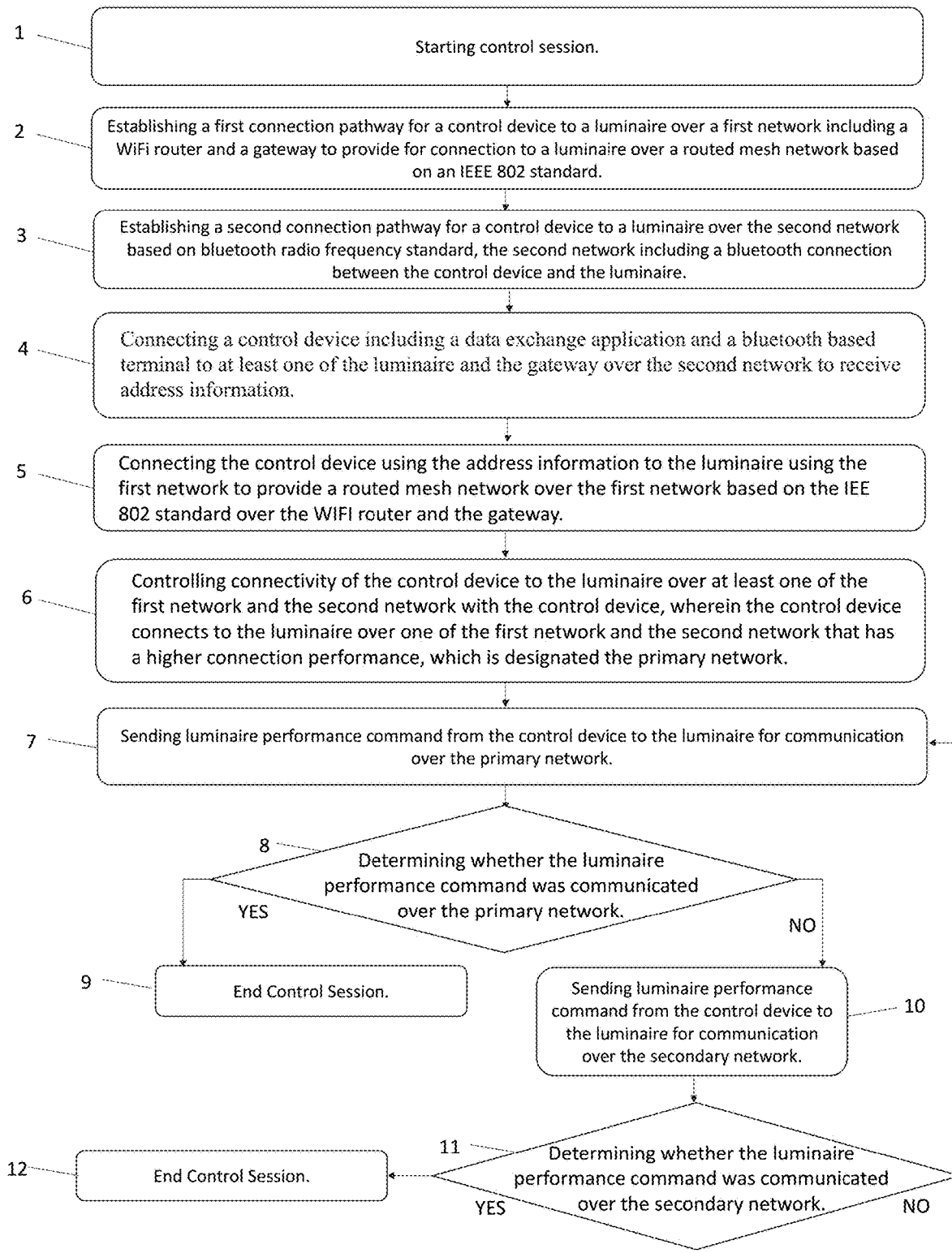
FIG. 7 is a flow chart depicting one embodiment of a method of controlling a lighting network, in accordance with one embodiment of the present disclosure.

FIG. 7 is a flow chart depicting one embodiment of a method of controlling a lighting network, as depicted in FIG. 6. It will be understood that each block of the flowchart illustrations and/or block diagrams, and combinations of blocks in the flowchart illustrations and/or block diagrams, can be implemented by computer readable program instructions. These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium, which can be non-transitory, that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). The module, segment or portion of instructions may be saved on a form of memory, i.e., hardware memory. A hardware processor may be employed to execute the one or more executable instructions for implementing the specified logical function(s). In some alternative implementations, the functions noted in the blocks may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

In one embodiment, the method can begin with setting up a lighting network, such as a lighting network including a first network, i.e., WiFi and Zigbee type IEEE 802 standard wireless network provided by connections 51, 53, 55, and second network, i.e., Bluetooth, e.g., BLE standard Bluetooth, provided by connections 56a, 56b, 56c, by providing a control device 100 including a data exchange application 144 that employs Bluetooth type connections, e.g., BLE connections 56a, 56b, 56c, to obtain network address information from WiFi routers 52. Referring to FIG. 7, the method may begin at block 1 with starting a control session, which can include opening the data exchange application 144 on the control device 100.

At block 2 of FIG. 7, the method may continue with establishing a first connection pathway for the control device 100 to the luminaire 1000 over a first network, e.g., first and second Win connections 51, 53 and the Zigbee connection 55, including a WIFI router 52 and a gateway 54 to provide for connection to a luminaire 1000 over a routed mesh network based on an IEEE 802 standard, as well as the Zigbee standard. Block 2 includes the physical installation and placement of the first network hardware, as illustrated in FIG. 5. At block 2, although the first connection pathway has been physically laid out and prepared for connection with the control device 100, the control device 100 is not wirelessly connected to the first connection pathway at this stage of the process flow. As will be described in further detail with reference to FIGS. 10-12, the luminaires may include at least one transceiver for receiving and transmitting command signals, feedback signals etc. using an IEEE 802 standard, such as the Zigbee standard.

At block 3 of FIG. 7, the method includes establishing a second connection pathway for a control device 100 to a luminaire 1000 over the second network based 56a, 56b, 56c on Bluetooth radio frequency standard, the second network including a Bluetooth connection between the control device 100 and the luminaire 1000, as illustrated in FIG. 6. In addition to the "point to point" connection between the control device 100 and the luminaire 1000 provided by the BLE connection identified by reference number 56a, the second connection pathway may also include a "point to point" connection from the control device 100 to the gateway 54 that is identified by reference number 56b. Further, a BLE connection identified by reference number 56c may be present between the gateway 54 and the luminaire 1000. As will be described in further detail with reference to FIGS. 10-12, the luminaires may include at least one transceiver for receiving and transmitting command signals, feedback signals etc. using a Bluetooth, e.g., BLE, standard. In this example, the gateway 54 may also employ at least one transceiver for receiving and transmitting signal using a Bluetooth, e.g., BLE, standard. At block 3, although the second connection pathway has been prepared for connection with the control device 100, the control device 100 is not wirelessly connected to the second connection pathway at this stage of the process flow.

Referring to block 4 of FIG. 7, the method may include connecting a control device 100 including a data exchange application 144 and a Bluetooth based transceiver 149 to at least one of the luminaire 100 and the gateway 54 over the second network to receive address information. The control device 100 is further depicted in FIG. 8, and includes applications 143 within memory 140 that include the data exchange application 144. As noted above, the numbers routers 52 and gateways 54 that are employed in a routed mesh network, such as the first network having WiFi connections 51. 53, and ZigBee type connections 55, can be difficult to initialize when setting up the network for controlling the luminaire 1000. The luminaire 1000 also includes a network address.

In some embodiments, for the initial setup of the network for lighting control, the control device 100 may employ the second network. i.e., Bluetooth connections, such as BLE, to obtain the complicated technical details, i.e., network addresses, from both the gateways 54, and peripheral devices, e.g., luminaires 1000. The control device 100 employs the data exchange application 144 to scan for BLE connections 56a, 56b to the peripheral device, e.g., luminaire 1000, and the gateway 54. In some embodiments, the control device 100 may also make connection with the WiFi router 51 using a Bluetooth/BLE signal, which can be used to determine the network address of the WiFi router 51.

Figure 8:
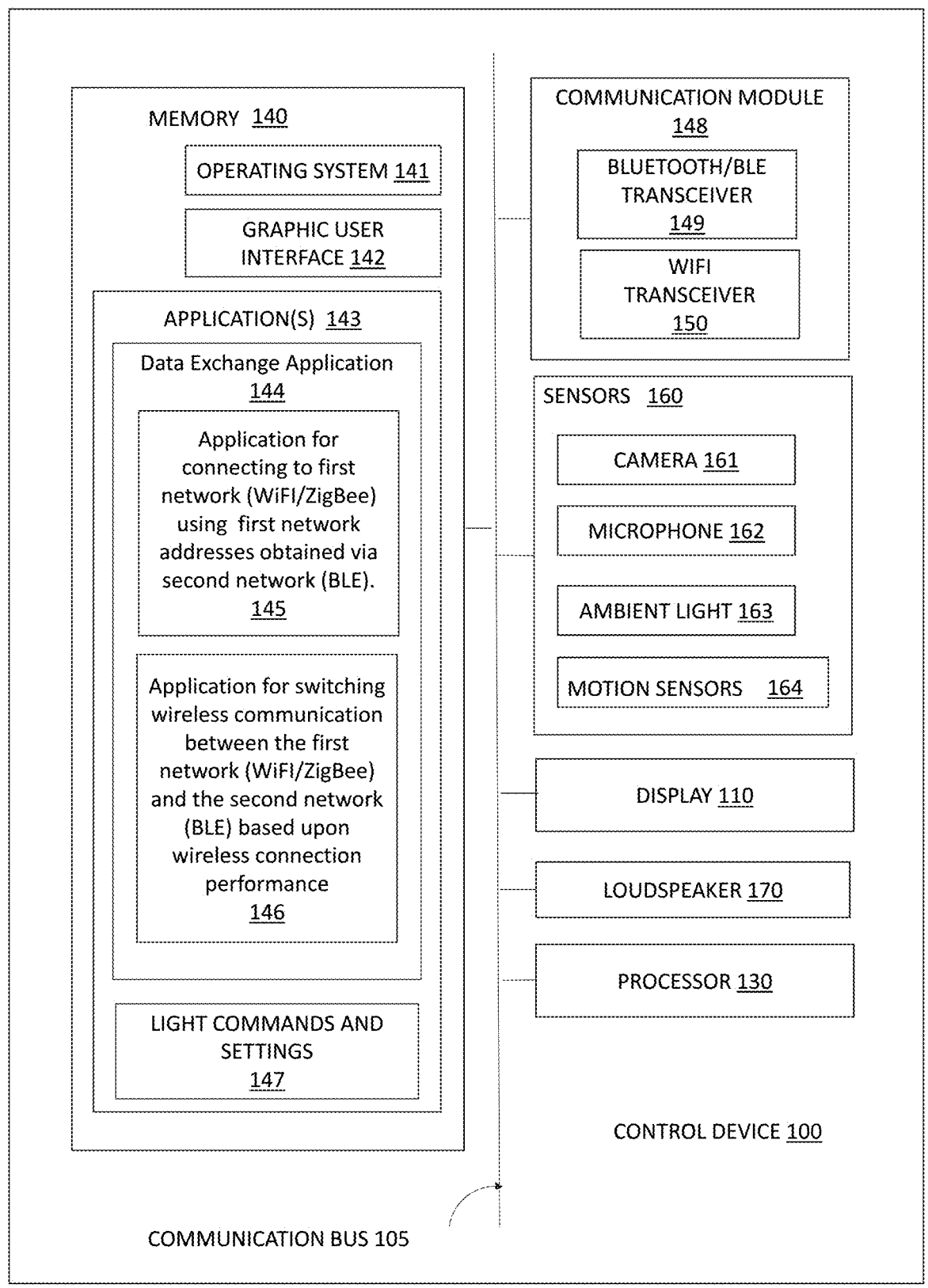
FIG. 8 is a block diagram of a control device for controlling luminaires that employs two communication networks, e.g., a first network based on the IEEE 802 standard, and a second network based on the Zigbee standard.
Figure 9:
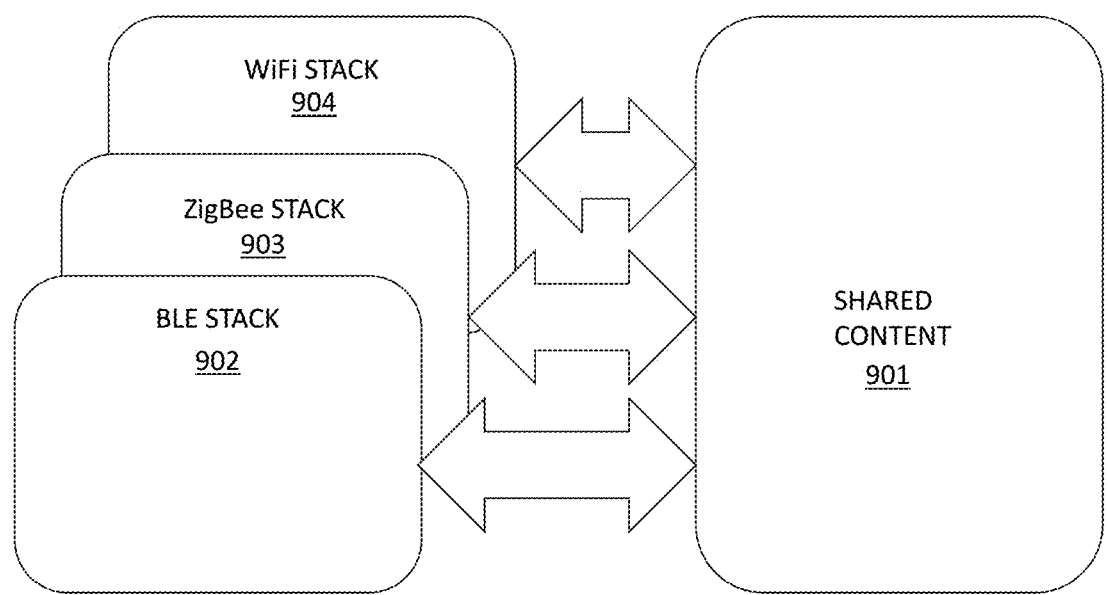
FIG. 9 is an illustration depicting sharing of address information between the WiFi stack of the IEEE 802 type standard network, the ZigBee stack of the IEEE 802 type standard network, and the Bluetooth Low Energy (BLE) stack of the Bluetooth stack, in accordance with one embodiment of the present disclosure.

Once connection, i.e., wireless communication, is made via the second network 56a, 56b, 56c, from the control device 100 to one of the luminaire 1000, the gateway 54, or from the gateway 54 to the luminaire 1000, a determination is made regarding the network addresses of the luminaire 1000 and the gateway 54. Once the network addresses is received over the second network, i.e., Bluetooth/BLE connection 56a, 56b, 56c, from the device, i.e., router 52, gateway 54, or peripheral device, e.g., luminaire 1000, the addresses are stored in a memory module accessible by the data exchange application 144 of the control device 100 (an example of which is depicted in FIG. 8). FIG. 9 depicts modules of memory for sharing of address information using a shared content module 901 for sharing network address information between the WiFi stack 904 of the IEEE 802 type standard network, i.e., first WiFi connection 51 to router 52, e.g., WiFi router, and the second Win connection 53 to the gateway 54; the ZigBee stack 903 of the IEEE 802 type standard network, i.e., Zigbee type connections 55 to the peripheral devices, luminaire 1000; and the Bluetooth Low Energy (BLE) stack of the Bluetooth stack 902. i.e., Bluetooth/BLE connection 56a from the control device 100 to the luminaire 1000, Bluetooth/BLE connection 56b from the control device 100 to the gateway 54, Bluetooth/BLE connection 56c from the gateway 54 to the luminaire 1000, and Bluetooth/BLE connection from the control device to the router 52, e.g., WiFi router. FIG. 9 illustrates one examples of an open systems interconnection data exchange model (OSI) mode. Using this model addresses obtained by the Bluetooth/BLE connections 56a, 56b, 56c for any of the devices that the control device 100 connects to is stored in a shared data 901 module.

In this example, by way of the Bluetooth/BLE connections 56a, 56b, 56c (and the BLE/Bluetooth connection from the control device 100 to the router 52), network addresses for connectable devices by IEEE type standard network, Zigbee type network 55, and/or Bluetooth/BLE connection network 56a, 56b, 56c are stored in the shared content 901 module of memory for access by the data exchange application 144 of the control device 100 for establishing network connections.

Further, the network addresses for any of the router 52, e.g., WiFi router, the gateway 54, and the peripheral devices, e.g., luminaires 1000, can also obtained through the first network, i.e., routed mesh network based on an IEEE 802 standard, as well as the Zigbee standard. More specifically, through connection of the first network, i.e., first WiFi connection 51 to the router 52, second WiFi connection 53 to the gate way 54, and Zigbee type connection 55 to the luminaire 1000, the control device 100 can obtain network addresses, e.g., IEEE 802 type standard network addresses, Zigbee standard network addresses and/or Bluetooth/BLE standard network addresses, for any of the devices that the control device 100 connects to is stored in a shared data 901 module.

In some embodiments, by using both networks, i.e., first network based on an IEEE 802 standard, as well as Zigbee standard, and second network based on Bluetooth/BLE connections, the network addresses, i.e., network addresses in IEEE 802 standard, Zigbee type standard and/or Bluetooth/BLE standard, can be stored for all connected devices, i.e., routers 52, gateways 54 and peripheral devices, e.g., luminaires 1000, in a shared content module 901 of memory, which can be accessed by the data exchange application 144 of the control device 100. This can provide for quickly switching between the first and second networks through the application 146 for switching wireless communication between the first network (WiFi/ZigBee) and the second network (BLE) based upon wireless connection performance of the control device 100, which has access to the shared content module 901. Further details regarding the application 146 of the control device 100 for switching wireless communication between the first network (WiFi/ZigBee) and the second network (BLE) based upon wireless connection performance is provided below with reference to blocks 6-12 of FIG. 7 and FIG. 8.

Referring to FIG. 7, the method can continue at block 5 with connecting the control device 100 using the address information to the luminaire 1000 using the first network to provide a routed mesh network over the first network 51, 53, 55 based on the IEE 802 standard/Zigbee standard over the WIFI router 52 and the gateway 54. To provide the connection to the first network, the control device 100 employs an application 145 for connecting to first network (WiFi/ZigBee) using first network addresses obtained via second network (BLE), which is a function of the data exchange application 144 of the control device 100. In the initial setup, which includes blocks 1-5 of FIG. 7, the data exchange application 144 of the control device 100, i.e., the application 145 for connecting to first network (WiFi/ZigBee) using first network addresses obtained via second network (BLE), accesses the shared content 901 to obtain the network addresses for at least one of the router 52, e.g., WiFi router, gateway 54, e.g., Zigbee gateway, and peripheral devices, e.g., luminaires 1000. As noted above, the arrangement of controlling peripheral devices, e.g., luminaires 1000, that employs a mesh of routers 52, e.g., WiFi routers, and gateways 54, e.g.., Zigbee gateways, through IEEE 802 and Zigbee type wireless standards can be difficult to initialize due to the number of network addresses and standards involved. The present method overcomes this problem by obtaining addresses using a "point to point" Bluetooth/BLE connection, and stores the addresses in a shared content module. In this example, the shared content 901 contains the network addresses, i.e., addresses for IEE802 standard and Zigbee type standard, for connection via the first pathway using the first network, i.e., first and second WiFi connections 51, 53, and Zigbee type connections 55, which were obtained using the second network employing Bluetooth/BLE wireless communication. Using the addresses obtained by the Bluetooth/BLE wireless connections, connection can be established to the first network 51, 53, 55 based on the IEE 802 standard/Zigbee standard over the WiFi router 52 and the gateway 54.

Blocks 1-5 of the method depicted in FIG. 7 represent an initialization stage of network control.

In some embodiments, the present disclosure may further include a mechanism for the control device 100 to connects to the luminaire 1000 over one of the first network and the second network that has a higher connection performance, as illustrated in blocks 6-12 of FIG. 7. It is noted that in some instances one or more of blocks 1-5 may be eliminated, once the network has been initiated, and the methods are directed to only providing that the higher performing network is selected for control of the peripheral device, i.e., luminaire 1000.

Referring to block 6. the control method may include controlling connectivity of the control device 10 to the luminaire 1000 over at least one of the first network 51, 53, 55, and the second network 56a, 56b, 56c with the control device 10, wherein the control device 10 connects to the luminaire 1000 over one of the first network 51, 53, 55 and the second network 56a, 56b, 56c that has a higher connection performance. The data exchange application 144 of the control device 100 may include a switching application 146 for switching wireless communication between the first network (WiFi/ZigBee) and the second network (BLE) based upon wireless connection performance.

Connection performance can mean whether a connection can be established from the control device 10 to the luminaire 1000. For example, after a command is issued from the control device 10 to the luminaire 1000 across the first and second network is received by the luminaire 1000, the luminaire 1000 sends a feedback signal back to the control device 10. In some embodiments, receipt of the feedback signal by the control device 10 allows the control device the ability to measure both whether a command issued by the control device 10 is received by the luminaire 1000 across at least one of the first and second networks, and the transmission speed, e.g., in Mbtyes. Using the receipt of a transmission, and transmission speed, as a metric is one embodiment of determining which of the first network, i.e., the network based on IEEE 802 and Zigbee standards, or the second network, i.e., the network based on Bluetooth/BLE standards, has the higher performance, i.e., higher transmission speed being equal to higher wireless connection performance. This is only one mechanism by which the higher performance network can be determined. The present disclosure is not limited to only this example.

In other embodiments, the proximity of the control device 100 to the peripheral device, e.g., luminaire 100, to be controlled, and the number of peripheral devices, e.g., luminaires 100, that are being controlled by the network may be used to determine whether the first network or the second network is the higher performing option. For example, the first network 51, 53, 55 of the WiFi connections via the IEEE 802 standard, e.g., first WiFi connection 51 from the control device 100 to the router 52, and the second WiFi connection 53 from the router 52 to the gateway 54, and the Zigbee type standards, e.g, Zigbee type connection from the router 52 to the luminaire 1000, has a greater range of connectivity, and can scale to a greater number nodes, e.g., luminaires 100, than the second network that is composed of the Bluetooth/BLE connections 56a, 56b, 56c. The second network that is composed of the Bluetooth/BLE connections is a less complicated interface, but as noted is only suitable for lesser numbers of connections over a lesser range. Therefore, in some embodiments, in determining the connection performance and the primary network, the switching application 146 for switching wireless communication between the first network (WiFi/ZigBee) and the second network (BLE)

based upon wireless connection performance selects the first network for large networks, in which the control device 100 is separated from at least some of the peripheral devices, e.g., luminaires 1000, by a substantial distance. In some embodiments, in determining the connection performance and the primary network, the switching application 146 for switching wireless communication between the first network (WiFi/ZigBee) and the second network (BLE) based upon wireless connection performance selects the second network for smaller networks, in which the control device 100 is separated from at least sonic of the peripheral devices, e.g., luminaires 1000, by a minimal distance. In some instances, in determining the connection performance and the primary network, the switching application 146 for switching wireless communication between the first network (WiFi/Zig-Bee) and the second network (BLE) based upon wireless connection performance selects the first network for commercial networks, and selects the second network for residential networks.

In some embodiments, the switching application 146 for switching wireless communication between the first network (WiFi/ZigBee) and the second network (BLE) based includes a manual selection mode, in which the user of the control device 100 can select whether commands are transmitted from the control device 100 to the luminaire 1000 over the first network that includes the WiFi and Zigbee type connections, or over the second network that includes the Bluetooth/BLE connections.

At block 7 of FIG. 7, following connection of the control device 100 to the network having the higher connection performance, i.e., the first network that includes the WiFi and Zigbee type connections, or over the second network that includes the Bluetooth/BLE connections, that is selected to be the primary method, the method may continue with sending a luminaire performance command from the control device 100 to the luminaire 1000.

The luminaire performance command issued from the control device 100 may include a selection of a grouping of luminaires 1000 to receive the command, For example, the command may include a designation of a scene, which may be a room containing luminaires, a floor of a building containing luminaires, or a building within a block of buildings including luminaires. Examples of scenes that can be rooms can include bedrooms, bathrooms, entertainment rooms, kitchens, hallways, garages and other similar rooms. The luminaire performance command issued from the control device 100 to the luminaire 1000 may also include a selection of lamp form factor. Example of lamp form factors that can be selected to be controlled by the control device 100 can include hanging pendant lamp, desk lamp, table lamp, floor lamp, chandelier lamp, recessed can downlight, light sources having a heat sinks, and 2×2 and/or 2×4 tube lighting office type fixtures. The luminaire performance command issued from the control device 100 to the luminaire 1000 can also include a tight setting corresponding to tight characteristics to be emitted by the selected luminaires 1000, e.g., selected scene and lamp form factor. The light setting corresponding to the light characteristics to be emitted by the selected luminaires 1000 may include light color, light temperature, light color saturation, light color intensity, and combinations thereof. The selection of the scenes, form factors, and light characteristic settings that are provided by the luminaire performance command that is issued from the control device 100 can be controlled by the light commands and settings application 147 of the control device 100, as depicted in FIG. 8. Following selection of the content for the luminaire performance command using the light commands and settings application, the luminaire performance command is transmitted by the communication module 148 of the control device 100. The communication module 148 may include a Bluetooth/BLE transceiver 149 and a WiFi transceiver 150 for sending and receiving signals to the appropriately selected network.

Referring to block 8 of FIG. 7, the method may continue with determining whether the luminaire performance command was communicated over the primary network. For example, after a command is issued from the control device 10 to the luminaire 1000 across the primary network is received by the luminaire 1000, the luminaire 1000 sends a feedback signal back to the control device 10 some embodiments, receipt of the feedback signal by the control device 10 indicates that the luminaire performance command was communicated over the primary network, and the method continues to block 9, which includes ending the control session. In some embodiments, following the end of the control session, a second control session may be started to adjust lighting a second time.

In some embodiments, when the feedback signal is not received back at the control device 10, the control device 10 can interpret the failure to receive a feedback signal as a failure of the primary network. The failure to receive a feedback signal at block 8 of FIG. 7 can signal that the control device 10 to switch networks for sending luminaire performance commands from using the previously designated primary network to the secondary network at block 10 of FIG. 7. For example, if the first network having WiFi connections 51, 53, and ZigBee type connections 55 is the primary network, and the control device 10 does not receive the feedback signal, the control device switches to sending the luminaire performance commands over the second network that is composed of the Bluetooth/BLE connections 56a, 56b, 56c. In another example, if the second network that is composed of the Bluetooth/BLE connections 56a, 56b, 56c is the primary network, and the control device 10 does not receive the feedback signal, the control device switches to sending the luminaire performance commands over the first network having WiFi connections 51, 53, and ZigBee type connections 55. The application 146 of the control device 100 for switching wireless communication between the first network (WiFi/ZigBee) and the second network (BLE) based upon wireless connection performance switches networks at block 10. To facilitate easiest initiation of the new network following switching, the application for switching wireless communication between the first network (WiFi/ZigBee) and the second network (BLE) based upon wireless connection performance employs network addresses for the first and second network from the shared content module 901, as depicted in FIG. 9. Following switching to the secondary network, the luminaire performance command is transmitted by the communication module 148 of the control device 100. The communication module 148 may include a Bluetooth/BLE transceiver 149 and a WiFi transceiver 150 for sending and receiving signals to the appropriately selected network.

Referring to FIG. 7, the method continues at block 11, which includes determining whether the luminaire performance command was communicated over the secondary network. For example, after a command is issued from the control device 10 to the luminaire 1000 across the secondary network is received by the luminaire 1000, the luminaire 1000 sends a feedback signal back to the control device 10. In some embodiments, receipt of the feedback signal by the control device 10 indicates that the luminaire performance command was communicated over the second network, and the method continues to block 12, which includes ending the control session. In some embodiments, following the end of the control session, at least a second control session may be started to adjust lighting at least a second time.

In some embodiments, when the feedback signal is not received back at the control device 100, the control device 100 can interpret the failure to receive a feedback signal as a failure of the secondary network. The failure to receive a feedback signal at block 11 of FIG. 7 can signal that the control device 100 to switch networks for sending luminaire performance commands from the secondary network to the primary network at block 7 of FIG. 7.

The application 146 of the control device 100 for switching wireless communication between the first network (WiFI/ZigBee) and the second network (BLE) based upon wireless connection performance switches networks at block 11 and 7. To facilitate easiest initiation of the new network following switching, the application for switching wireless communication between the first network (Wifi/ZigBee) and the second network (BLE) based upon wireless connection performance employs network addresses for the first and second network from the shared content module 901, as depicted in FIG. 9. Following switching back to the primary network, the luminaire performance command is transmitted by the communication module 148 of the control device 100 at block 7 of FIG. 7. The communication module 148 may include a Bluetooth/BLE transceiver 149 and a WiFi transceiver 150 for sending and receiving signals to the appropriately selected network.

It is noted the process sequence may continue through blocks 7. 8, 10 and 11, until it is determined that the luminaire 1000 receives the luminaire performance command at either of blocks 8 and 11, which results in ending the control session at blocks 9 and 12. In some embodiments, following the end of the control session, at least a second control session may be started to adjust lighting at least a second time.

FIG. 8 is a block diagram of a control device 100 for controlling luminaires 1000 that employs two communication networks, e.g., a first network based on the IEEE 802 standard 51, 53, 55, and a second network based on the Zigbee standard 56a, 56b, 56c. The control device 100 depicted in FIG. 8 provides one embodiment of a control device 100 for sending luminaire performance commands to the luminaires 1000 over the first and second network depicted in FIGS. 5 and 6, in accordance with the methods described with reference to FIG. 7.

In one embodiment, the control device 100. i.e., lighting control system, includes a first transceiver, i.e., WiFi transceiver 150, for IEEE 802 connection to a routed mesh network 51, 53, 55 that connects the control device 100 to a luminaire 1000, wherein the routed mesh network is based on an IEEE 802 standard and includes a first WiFi connection 51 of the control device 10 to a router 52, a second WiFi connection 53 of the router 52 to a gateway 54, and a gateway connection 55, e.g., via Zigbee type connection, from the gateway 54 to the luminaire 1000. In one embodiments, the lighting control system, i.e., control device 100, includes a second transceiver, i.e., Bluetooth/BLE transceiver 149, based on Bluetooth/BLE radio frequency standard, the second network including a first Bluetooth connection 56a between the control device 100 and the luminaire 1000, and a second network connection 56b between the control device 100 and the gateway 54. The control device 100 also includes a data exchange application 144 run from the mobile device 100 for sharing address information for the gateway 54 and the luminaires 1000 between the first and second network.

The control device 100 can employ any of a wide range of computing platforms. The control device 100 may be a laptop/notebook computer, sub-notebook computer, a tablet, phablet computer; a mobile phone, a smartphone; a personal digital assistant (PDA), a portable media player (PMP), a cellular handset; a handheld gaming device; a gaming platform; a wearable computing device, a body-borne computing device, a smartwatch, smart glasses, smart headgear, and a combination thereof. It is noted that the block diagram that is depicted in FIG. 8 only includes some components that can be incorporated into the control device 100. It is noted that some of the components depicted in FIG. 8 may be omitted, and that some components may be added to the block diagram illustrated in FIG, 8 consistent with the specific type of control device 100.

The computing device 100 may include memory 140 and one or more processors 130. Memory 140 can be of any suitable type (e.g., RAM and/or ROM, or other suitable memory) and size, and in some cases may be implemented with volatile memory, non-volatile memory, or a combination thereof. A given processor 130 of computing device 100 may be configured as typically done, and in some embodiments may be configured, for example, to perform operations associated with control device 100 and one or more of the modules thereof (e.g., within memory 140 or elsewhere). In some cases, memory 140 may be configured to be utilized, for example, for processor workspace (e.g., for one or more processors 130) and/or to store media, programs, applications, and/or content on computing device 100 on a temporary or permanent basis.

The one or more modules stored in memory 140 can be accessed and executed, for example, by the one or more processors 130 of computing device 100. In accordance with some embodiments, a given module of memory 140 can be implemented in any suitable standard and/or custom/proprietary programming language, such as, for example C, C++, objective C, JavaScript, and/or any other suitable custom or proprietary instruction sets, as will be apparent in light of this disclosure. The modules of memory 140 can be encoded, for example, on a machine-readable medium that, when executed by one or more processors 130, carries out the functionality of computing device 100, in part or in whole. The computer-readable medium may be, for example, a hard drive, a compact disk, a memory stick, a server, or any suitable non-transitory computer/computing device memory that includes executable instructions, or a plurality or combination of such memories. Other embodiments can be implemented, for instance, with gate-level logic or an application-specific integrated circuit (ASIC) or chip set or other such purpose-built logic. Sonic embodiments can be implemented with a microcontroller having input/output capability (e.g., inputs for receiving user inputs; outputs for directing other components) and a number of embedded routines for carrying out the device functionality. In a more general sense, the functional modules of memory 140 (e.g., such as operating system (OS) 142, graphic user interface (GUI) 143, and/or one or more applications 143, each discussed below) can be implemented in hardware, software, and/or firmware, as desired for a given target application or end-use. The memory 140 may include an operating system (OS) 142. The OS 142 can be implemented with any suitable OS, mobile or otherwise, such as, for example, Android OS from Google, Inc.; iOS from Apple, Inc.; BlackBerry OS from BlackBerry Ltd.; Windows Phone OS from Microsoft Corp; Palm OS/Garnet OS from Palm, Inc.; an open source OS, such as Symbian OS; and/or a combination of any one or more thereof. As will be appreciated in light of this disclosure, OS 142 may be configured, for example, to aid with sending luminaire performance commands to the luminaires 1000 over the first and second network depicted in FIGS. 5 and 6, in accordance with the methods described with reference to FIG. 7.

The applications 143 within the memory 140 of the control device 100 further include a data exchange application 144 and a light comments and settings application 147. In some embodiments, the control device 100 employing the processors 130 and the instructions stored in the memory 140 is configured to send luminaire performance commands to the luminaires 1000 over networks that are initiated and selected using the data exchange application 144, in which includes the initiation application 145 for connecting to the first network (WiFi/Zigbee) using first network addresses obtained via the second network, and the network switch application 146 for switching wireless communication between the first network (WiFi/ZigBee) and the second network (BLE) based upon the wireless connection performance.

The initiation application 145 for connecting to the first network (WiFi/Zigbee based) using first network addresses obtained via the second network (Bluetooth/BLE based) can include a sequence of instructional steps stored in the memory 140 of the control device to be actuated by the processor 130 to send wireless communications signals over the communication module 148 to set up a network for controlling luminaire 1000 lighting characteristics, as described with reference to blocks 1-5 of FIG. 7. As described with reference to FIG. 7, Bluetooth/BLE wireless network connections may be employed to obtain network addresses to set up a network employing WiFi connections based upon the IEEE 802 standard and the Zigbee type standard. As described with reference to FIGS. 7 and 9, the network addresses may be stored in a shared content module 901, which may be stored in the memory 140 of the control device for access by the applications 143 of the control device 100.

The network switch application 146 for switching wireless communication between the first network (WiFi/Zigbee based) and the second network (Bluetooth/BLE based) based upon wireless connection performance can include a sequence of instructional steps stored in the memory 140 of the control device to be actuated by the processor 130 to send wireless communications signals over the communication module 148 using the highest performing network, as described with reference to blocks 6-12 of FIG. 7. The communication module 148 may also be used by the network switch application 146 to receive feedback signals from the router 52, the gateway 54 and the luminaire 1000 in determining the highest speed networks, and whether a network, and to determine whether a network is not functioning. In switching between the first and second networks, the network switch application 146 may employ the network addresses be stored in a shared content module 901.

In addition to the data exchange application 144, the applications 143 stored in the memory 140 of the control device 100 include light commands and settings 147. The light commands and settings 147. The light and command settings 147 application allow the user of the control device 100 to select light characteristics, such as light color, light color temperature, light intensity, etc., to be emitted by the luminaires 1000 within the control of the network. The content, i.e., data, to be transmitted from the light control 100 with the luminaire performance command are selected using the light and command settings 147 application. The light and command settings 147 can also select which luminaires 1000, e.g., which scene and lamp form factor, will receive the luminaire performance command from the control device 100. The data exchange application 144 provides that the user of the control device 100 can select the light characteristics to be emitted by the luminaires 1000 following receive of the luminaire performance command, and which luminaires 1000 are to receive the luminaire performance command, from the display 110 of the control device 100 using the graphic user interface 142.

The display 110 can be any electronic visual display or other device configured to display or otherwise generate an image (e.g., image, video, text, and/or other displayable content) therefrom. In some embodiments, the display 110 is a touchscreen display or other touch-sensitive display that can utilize any of a wide range of touch-sensing techniques, such as, for example: resistive touch-sensing; capacitive touch-sensing; surface acoustic wave (SAW) touch-sensing; infrared (IR) touch-sensing; optical imaging touch-sensing; and/or a combination of any one or more thereof. The touch screen display 110 may be configured to detect or otherwise sense direct and/or proximate contact from a user of the control device 100 a finger, stylus, or other suitable implement (which can be collectively referred to as a touch gesture) at a given location of that display 110. The touch screen display 110 may be configured to translate such contact into an electronic signal that can be processed by the control device 100 (e.g., by the one or more processors 130 thereof) and manipulated or otherwise used to trigger a given GUI action. In some cases, a touch-sensitive display 110 may facilitate user interaction with computing device 100 via. the graphic user interface 25 presented by such display 110.

Referring to FIG. 8, the control device 100 includes a communications module 148 that includes at least one transceiver for communication with the first and second networks. A transceiver is a device that can both transmit and receive communications, in particular a combined radio transmitter and receiver. In some instances, a transceiver is a device comprising both a transmitter and a receiver that are combined and share common circuitry or a single housing. When no circuitry is common between transmit and receive functions, the device is a transmitter-receiver. It is noted that both configurations are suitable for use with the structure depicted in FIG. 8, as well as separate transmitters and receivers, so long as selected devices in the communications module 148 can provide the functions of receiving and transmitting signals for the 802.11 standard, Zigbee type standard and the Bluetooth/BLE standard. For example, at least one series of components within the communications module 148 provides a Bluetooth/BLE transceiver 149 and at least one series of components within the communications module provides the WiFi transceiver 150. The WiFi transceiver 150 receives and seconds signals to the first network, including the first and second WiFi connections 51, 53 and the Zigbee type connection 55. Further details on the signal standards employed in first network have been provided with reference to FIG. 5. The Bluetooth/BLE transceiver 149 receives and seconds signals to the second network, including the Bluetooth signals, e.g., BLE 55 signals 56*a*, 56*b*, 56*c*, Further details on the signal standards employed in the second network have been provided with reference to FIG. 6.

In some embodiments, the communications module 148 may include a combined BLE and Zigbee type transceiver. For example, the combined BLE and Zigbee type transceiver may be provided by an EFR32™ Mighty Gecko Mesh Networking Wireless system on chip (SOC) device available from Silicon Labs, Inc. The Zigbee component of the combined BLE and Zigbee type transceiver has the following characteristics:

2.4 GHz IEEE 802.15.4
250 kbps O-QPSK DSSS
Receive Sensitivity:–102.7 dBm @250 kbps O-QPSK DSSS
Programmable Output Power: +19 dBm
Active Mode RX: 10.2 mA
Active Mode TX: 8.5 mA @0 dBm The Bluetooth/BLE component of the combined BLE and Zigbee type transceiver has the following characteristics:

Compatible with Bluetooth 5 Specification
Receive Sensitivity: –103.3 dBm @125 kbps GFSK
Programmable Output Power: +19 dBm
Active Mode RX: 9.5 mA
Active Mode TX: 8.5 mA @ 0 dBm The communication module 148 may also be configured for wired (e.g., Universal Serial Bus or VSB, Ethernet, FireWire, etc.) communication using any suitable wired transmission technology, as desired. In some embodiments, the communication module 148 may be configured for communication by cellular signal used in cellular phones, and cellular type devices.

In accordance with some embodiments, mobile computing device 100 may include one or more sensors 160. In some instances, instead of employing a touch interface or in combination with the touch interface, the motion of the control device 100 may be employed to for selecting light settings. The motion sensors 164 of the sensors 160 housed within the control device 100 can be used to measure motions applied to the control device 100, which are correlated to commands for changes in lighting characteristics of the luminaires 1000.

In some embodiments, a given control device 100 may include other sensors 160, which can include at least one camera 161 (or image capture device), microphone 162 (or sound capture device), ambient light sensor 163, and/or any other suitable sensor to, for example, implement the techniques variously described herein.

In accordance with some embodiments, control device 100 (also referred to as controller) may include one or more loudspeakers 170 or other audio output devices, in accordance with some embodiments. Loudspeaker(s) 170 can be, for example, a speaker or any other device capable of producing sound from an audio data signal, in accordance with some embodiments. In some embodiments, the loudspeaker(s) can emit a tone as an affirmation single that the luminaire 1000 has received a signal to set the light being projected from the lamp consistent with the luminaire performance command.

As illustrated in FIG. 8, the aforementioned elements of the mobile computing device 100 may be interconnected with a communications bus 105.

Figure 10:
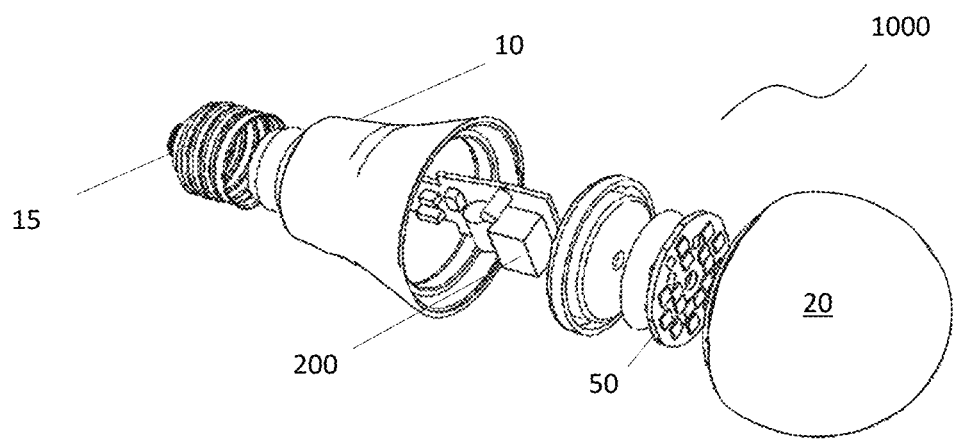
FIG. 10 is a perspective exploded view of a luminaire including transceivers that employs two communication networks, e.g., a first network based on the IEEE 802 standard, and a second network based on the Zigbee standard, in accordance with one embodiment of the present disclosure.
Figure 11:
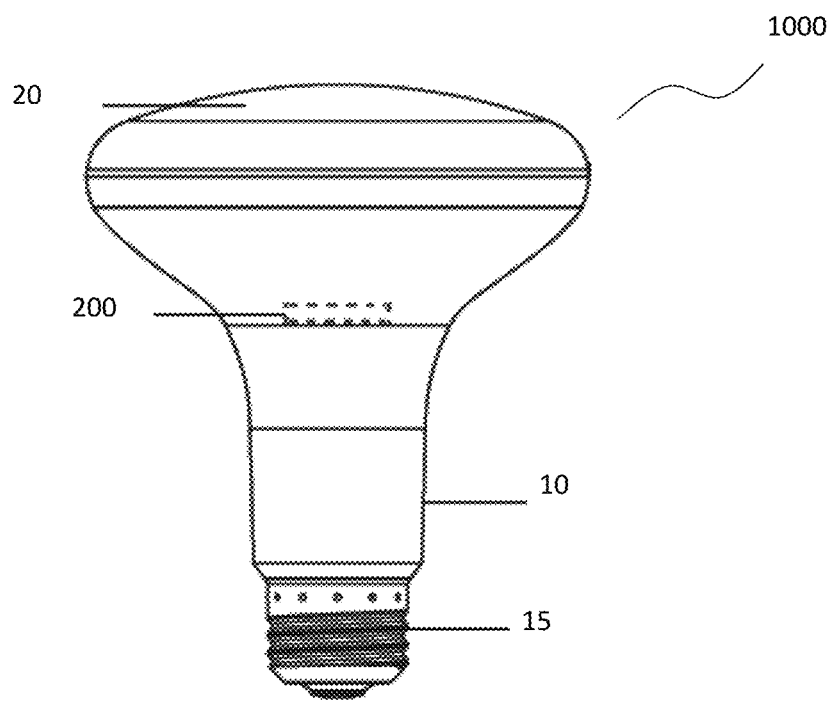
FIG. 11 is a perspective side view of a luminaire including transceivers that employs two communication networks, e.g., a first network based on the IEEE 802 standard, and a second network based on the Zigbee standard, in accordance with one embodiment of the present disclosure.
Figure 12:
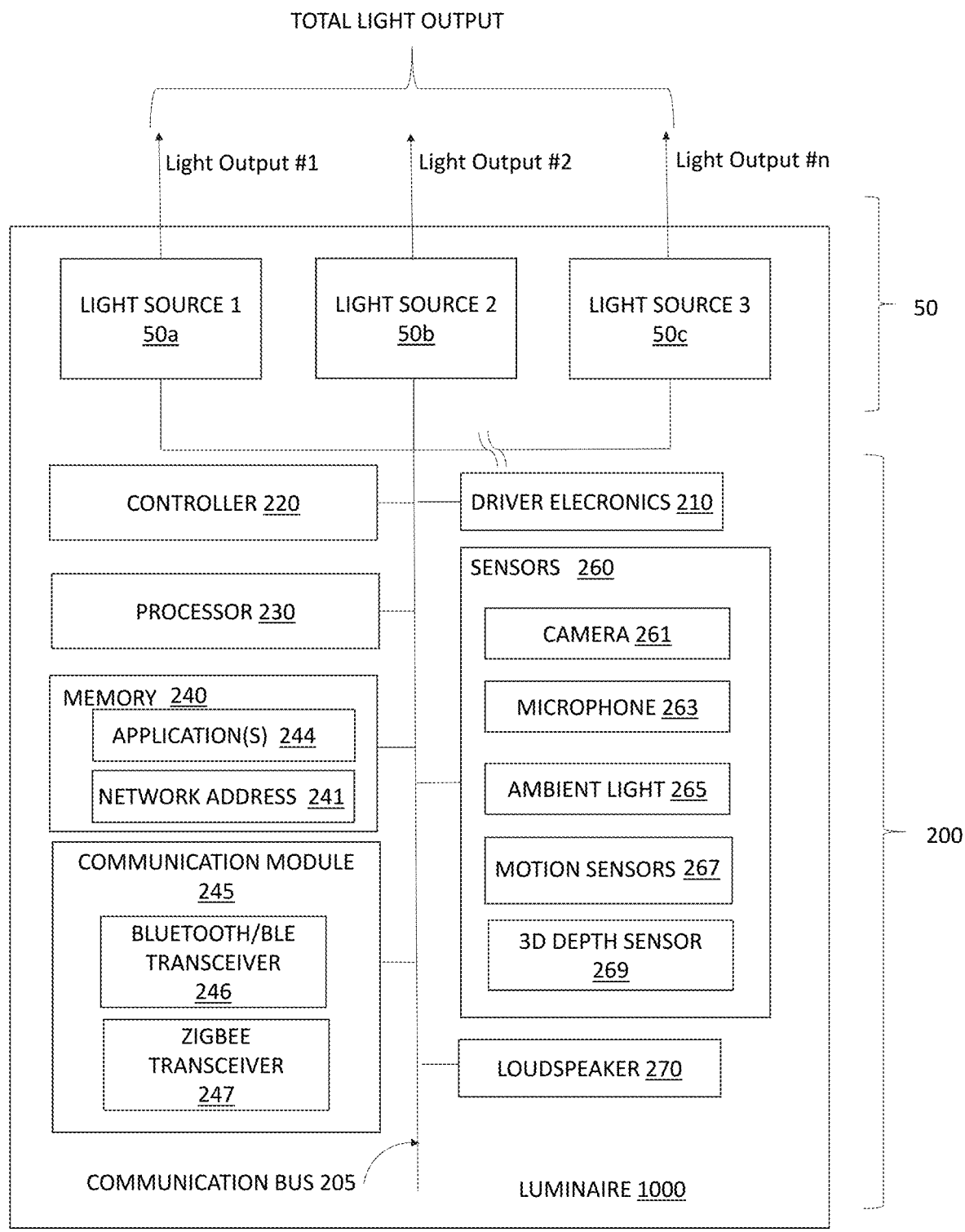
FIG. 12 is a block diagram of a luminaire including transceivers that employs two communication networks, e.g., a first network based on the IEEE 802 standard, and a second network based on the Zigbee standard, in accordance with one embodiment of the present disclosure.

FIGS. 10-12 illustrate one embodiment of a luminaire 1000 that includes a housing including a body 10 and a lens 20, in which a light source 50 is positioned within the housing to emit light through the lens 20. The light source 50 includes at least one light emitting diode (LED). The luminaire 1000 further includes an electronics package including driving electronics 210, a microcontroller 220, and a communication module 245. In one embodiment, the driving electronics 210 power the light source 50, and the microcontroller 220 actuates the driving electronics in controlling the lighting characteristics of the light being emitted by the luminaire 1000. In one embodiment, the communications module 245 includes a first transceiver for IEEE 802 standard based network connection to a routed mesh network, and a second transceiver for connection for a Bluetooth based network connection. The first transceiver for IEEE 802 standard based connection can provide for communication with the first network having the first and second WiFi connections 51, 53 and the Zigbee type connection 55, as depicted in FIG. 5. The second transceiver is for connection for with the second network having the Bluetooth based network connections, e.g., Bluetooth BLE connections 56a, 56b, 56c, as depicted in FIG. 6. The electronics package 200 also includes memory 240 for storing addresses for the Zigbee type connection 55 and the Bluetooth BLE connections 56a, 56c.

Referring to FIGS. 10 and 11, the luminaire 100 may include a body portion 10. the material, geometry, and dimensions of which may be customized, as desired for a given target application or end-use. In some embodiments, the body 10 has a first end, e.g., base portion 15, for engagement to an electrical source for energizing the light sources 50, i.e., first, second and third strings of LEDs 50a, 50b, 50c contained within the body 10, and the body 10 includes a second end having an optic 20, e.g., lens, through which the light sources 50 emit light.

A given optic 20 may be configured to transmit, in part or in whole, emissions received from a given string of the first and second strings of LEDs 50a, 50b, 50c of the light source 50 that is positioned behind the given optic 20 and housed within the base portion 10 of the lamp 100. The optic 20 may be formed from any one, or combination, of suitable optical materials. For instance, in some embodiments, the optic 20 may be formed from a polymer, such as poly (methyl methacrylate) (PMMA) or polycarbonate, among others. In some embodiments, the optic 20 may be formed from a ceramic, such as sapphire (Al low$_3$) or yttrium aluminum garnet (YAG), among others. In some embodiments, the optic 20 may be formed from a glass. In some embodiments, the optic 20 can be formed from a combination of any of the aforementioned materials. Furthermore, the dimensions and geometry of the optic 20 may be customized, as desired for a given target application or end-use. In some embodiments, the optic 20 may be or otherwise include a lens, such as a Fresnel lens, a converging lens, a compound lens, or a micro-lens array, to name a few. In some embodiments, the optic 20 may be or otherwise include an optical dome or optical window. In some cases, the optic 20 may be formed as a singular piece of optical material, providing a monolithic optical structure. In some other cases, the optic 20 may be formed from multiple pieces of optical material, providing a polylithic (multi-piece) optical structure. In some instances, the optic 20 may be configured to filterlight transmitted there through. Other suitable configurations for optic(s) 20 will depend on a given application and will be apparent in light of this disclosure.

The base portion 15 may be configured to be operatively coupled with a given power socket so that power may be delivered to lamp 100 for operation thereof. To that end, base portion 15 may be of any standard, custom, or proprietary contact type and fitting size, as desired for a given target application or end-use. In some cases, base portion 15 may be configured as a. threaded lamp base including an electrical foot contact (e.g., an Edison-type screw base, such as in FIGS. 10 and 11). In some other cases, base portion 15 may be configured as a bi-pin, tri-pin, or other multi-pin lamp base. In some other cases, base portion 15 may be configured as a twist-lock mount lamp base. In some other cases, base portion 15 may be configured as a bayonet connector lamp base. Other suitable configurations for body portion 10 and base portion 15 will depend on a given application and will be apparent in light of this disclosure.

It is noted that the structure and lamp systems of the present disclosure are not limited to only the form factor for the luminaire 1000 that is depicted in FIGS. 10 and 11. As will be appreciated in light of this disclosure, the lamp as variously described herein may also be configured to have a form factor that is compatible with power sockets/enclosures typically used in existing luminaire structures. For example, some embodiments may be of a PAR20, PAR30, PAR38, or other parabolic aluminized reflector (PAR) configuration. Some embodiments may be of a BR30, BR40, or other bulged reflector (BR) configuration. Some embodiments may be of an A19, A21, or other A-line configuration. Some embodiments may be of a T5, T8, or other tube configuration.

Referring to FIGS. 11-12, present within the body 10, and between the base portion 15, and the optic 20, the luminaire 100 also includes solid state light emitters, e.g., first string of LEDs 50a, second string of LEDs 50b, and second string of LEDs 50c, Some examples of solid state light emitters that are suitable for the methods and structures described herein include inorganic semiconductor light-emitting diodes (LEDs), organic light-emitting diodes (OLED), polymer light-emitting diodes (PLED) or combinations thereof. In some embodiments, a given solid-state emitter may be configured for color-tunable emissions. For instance, in some cases, a given solid-state emitter may be a multi-color (e.g., bi-color, tri-color, etc.) semiconductor light source configured for a combination of emissions, such as: (1) red-green-blue (RGB); (2) red-green-blue-yellow (RGBY); (3) red-green-blue-white (RGBW); (4) dual-white; and/or (5) a combination of any one or more thereof. Although the following description describes an embodiment in which the solid state light emitters are provided by light emitting diodes, any of the aforementioned solid state light emitters may be substituted for the LEDs.

Referring to FIGS. 10-12, the luminaire 1000 further includes driver electronics 210. In some embodiments, the LED strings 50a, 50b, 50c are driven by the driver electronics 25 that convert the power received at the base 15, which is AC-DC voltage to DC voltage that can drive the LED strings 50a, 50b, 50c. The driver electronics 210 can be positioned in the base of the luminaire 1000.

FIG. 12 is a block diagram depicting an exemplary luminaire (also referred to lamp) 1000 that can work in communication with the control device 100, i.e., controller, for controlling lighting, as described with reference to FIG. 8, through the first and second networks that are described with reference to FIGS. 5 and 6. As can be seen, luminaire 1000 may include one or more light sources 50, e.g., strings of light emitting diodes (LEDs) 50a, 50b, 50c that each provide corresponding light output. The number n of strings of light emitting diodes (LEDs) 50a, 50b, 50c for a given luminaire 1000 can be customized as desired for a given target application or end-use.

Referring to FIG. 12, the luminaire 1000 may include at least one controller 220, at least one processor 230, and memory 240. Controller(s) 220 may be configured to be operatively coupled (e.g., via a communication bus or other suitable interconnect) with light sources 50 or corresponding componentry, such as the light source drivers (not shown), to control the light output provided therefrom. Note that the light output from each string of LEDs 50a, 50, 50c creates a total light output. In some embodiments, luminaire 1000 may include a centralized controller 220 and/or processor 230 configured to control the light output of the luminaire 1000, and to provide the light characteristics designated by the luminaire performance command received by the luminaire 1000 from the control device 100, such as adjustments in color for light emitted by the light source 50, adjustments in the brightness of the light emitted by the light source 50, adjustments in the color temperature of the light emitted by the light source 50; adjustments in the intensity of the color of light emitted by the light source 50; adjustments in the saturation of the color of light emitted by the light source 50; and combinations and varieties of the aforementioned command types. The commands may include to turn the luminaire "ON", and to turn the luminaire "OFF".

In some such embodiments, the control of the light output may be wired and/or wireless, depending upon the given configuration. In some embodiments, the light emitting diodes 50a, 50b, 50c of the light source 50 of luminaire 1000 may be individually controlled. The controller 220 is in communication with the communication bus 205, hence receives signals from the mobile computing device 100 through the communications module 245. The signals received from the mobile computing device 100 can include information on selected light emission adjustments, which can include light color, light intensity/dimming and light color temperature, that was selected by the user for the type of light to be projected by the luminaire 1000 consistent with the settings that are selected, as described in block 7 of the method depicted in FIG. 4. The controller 220 can control the light output to meet the requirements of the selected light function adjustment signaled (by luminaire performance command) from the control device 100.

The memory 240 used by the luminaire 1000 can be of any suitable type (e.g., RAM and/or ROM, or other suitable memory) and size, and in some cases may be implemented with volatile memory, non-volatile memory, or a combination thereof. A given processor 230 may be configured as typically done, and in some embodiments may be configured, for example, to perform operations associated with the luminaire 1000 or a given light source 50, e.g., light emitting diode (LED) 50a, 50b, 50c, and one or more of the modules thereof (e.g., within memory 240 or elsewhere). In some cases, memory 240 may be configured to be utilized, for example, for processor workspace (e.g., for one or more processors 230) and/or to store media, programs, applications 244, and/or content for luminaire 1000 or system on a temporary or permanent basis. The applications 244 may include a series of instructions that enable the luminaire 1000 to operate in accordance with the initiation of network steps that are described with reference to blocks 1-5 of FIG. 7. The applications 244 may include a series of instructions that enable the luminaire 100 to operate in accordance with the switching of networks between the first network 51, 53, 55, and the second network 56a, 56b, 56c, as described with reference to blocks 6-12 of FIG. 7.

The one or more modules stored in memory 240 can be accessed and executed, for example, by the one or more processors 230 of the luminaire 1000. In accordance with some embodiments, a given module of memory 240 can be implemented in any suitable standard and/or custom/proprietary programming language, such as, for example: (1) C; (2) C++; (3) objective C; (4) JavaScript; and/or (5) any other suitable custom or proprietary instruction sets, as will be apparent in light of this disclosure. The modules of memory 240 can be encoded, for example, on a machine-readable medium that, when executed by a processor 230, carries out the functionality of the luminaire 1000 or system, in part or in whole. The computer-readable medium may be, for example, a hard drive, a compact disk, a memory stick, a server, or any suitable non-transitory computer/computing device memory that includes executable instructions, or a plurality or combination of such memories. Other embodiments can be implemented, for instance, with gate-level logic or an application-specific integrated circuit (ASIC) or chip set or other such purpose-built logic. Some embodiments can be implemented with a microcontroller having input/output capability (e.g., inputs for receiving user inputs; outputs for directing other components) and a number of embedded routines for carrying out the device functionality. In a more general sense, the functional modules of memory 240 (e.g., one or more applications 242, discussed below) can be implemented in hardware, software, and/or firmware, as desired for a given target application or end-use.

In accordance with some embodiments, the memory 240 of the luminaire 1000 may have stored therein (or otherwise have access to) one or more applications 244. In some instances, a given luminaire 1000 may be configured to receive input, for example, via one or more applications 244 stored in memory 240. For instance, an example application 244 may allow a user to program or configure a luminaire 1000 to project light having characteristics responsive to the luminaire performance command sent by the control device 100, such as the light color, light intensity/dimming, or light temperature color, as described in block 7 of the method depicted in FIG. 7.

The memory 240 may also include a module for network addresses 241. The module for network addresses 241 may include addresses for connection by the Zigbee standard and the Bluetooth standard, e.g., BLE standard.

In some embodiments, the lamp 1000 may include a communication module 245, having at least one transceiver for communication with the first and second networks. A transceiver is a device that can both transmit and receive communications, in particular a combined radio transmitter and receiver. In some instances, a transceiver is a device comprising both a transmitter and a receiver that are combined and share common circuitry or a single housing. When no circuitry is common between transmit and receive functions, the device is a transmitter-receiver. It is noted that both configurations are suitable for use with the structure depicted in FIG. 12, as well as separate transmitters and receivers, so long as selected devices in the communications module 245 can provide the functions of receiving and transmitting signals for the Zigbee type standard and the Bluetooth/BLE standard. For example, at least one series of components within the communications module 245 provides a Bluetooth/BLE transceiver 246 and at least one series of components within the communications module 245 provides the Zigbee transceiver 247.

The Zigbee transceiver 247 receives and seconds signals to the first network including the Zigbee type connection 55. Further details on the signal standards employed in first network have been provided with reference to FIG. 5.

The Bluetooth/BLE transceiver 246 receives and seconds signals to the second network, including the Bluetooth signals, e.g., BLE 55 signals 56a, 56c. Further details on the signal standards employed in the second network have been provided with reference to FIG. 6.

In some embodiments, the communications module 245 may include a combined BLE and Zigbee type transceiver. For example, the combined BLE and Zigbee type transceiver may be provided by an EFR32™ Mighty Gecko Mesh Networking Wireless system on chip (SOC) device available from Silicon Labs, Inc. The Zigbee component of the combined BLE and Zigbee type transceiver has the following characteristics:

2.4 GHz IEEE 802.15.4
  250 kbps O-QPSK DSSS
  Receive Sensitivity: −102.7 dBm @250 kbps O-QPSK DSSS
  Programmable Output Power: +19 dBm
  Active Mode RX: 10.2 mA
  Active Mode TX: 8.5 mA @0 dBm The Bluetooth/BLE component of the combined BLE and Zigbee type transceiver has the following characteristics:

Compatible with Bluetooth 5 Specification
  Receive Sensitivity: −103.3 dBm @125 kbps GFSK
  Programmable Output Power: +19 dBm
  Active Mode RX: 9.5 mA
  Active Mode TX: 8.5 mA @ 0 dBm The communication module 245 may also be configured for wired (e.g., Universal Serial Bus or USB, Ethernet, FireWire, etc.) communication using any suitable wired transmission technology, as desired. In some embodiments, the communication module 245 may be configured for communication by cellular signal used in cellular phones, and cellular type devices. The communication module 245 may be configured to facilitate inter-system communication between the luminaires 1000 and the control device 100.

In accordance with some embodiments, a given luminaire 1000 may include one or more optional sensors 260. In some embodiments, a given luminaire 1000 optionally include at least one camera 261 (or image capture device), microphone 263 (or sound capture device), ambient light sensor 265, motion sensor 267, 3-dimensional (3D) depth sensor 269, and/or any other suitable sensor. When included, sensor(s) 260 may be configured as typically done. In another example, microphone 263 may he configured to detect voice commands used to control the luminaire 1000. In any case, the sensor(s) 260 of a given luminaire 1000 may include componentry as desired for a given target application or end-use.

In accordance with some embodiments, a given luminaire 1000 may include one or more loudspeakers 270 or other audio output devices. Loudspeaker(s) 270 can be, for example, a speaker or any other device capable of producing sound from an audio data signal, in accordance with some embodiments. Loudspeaker(s) 270 may be programmed using any suitable techniques and they may be configured to output audio related to the lighting control techniques variously described herein. For example, controller 220 and/or processor 230 may be configured to control audio output of the loudspeakers) 270 to provide audio feedback as to whether an attempted command, i.e., luminaire performance command sent from the control device 100, has been recognized or provide audio feedback relating to the specific command detected or the resulting change in light output.

It is to be appreciated that the use of any of the following "/", "and/or", and "at least one of", for example, in the cases of "A/B", "A and/or B" and "at least one of A and B", is intended to encompass the selection of the first listed option (A) only, or the selection of the second listed option (B) only, or the selection of both options (A and B). As a further example, in the cases of "A, B, and/or C" and "at least one of A, B, and C", such phrasing is intended to encompass the selection of the first listed option (A) only, or the selection of the second listed option (B) only, or the selection of the third listed option (C) only, or the selection of the first and the second listed options (A and B) only, or the selection of the first and third listed options (A and C) only, or the selection of the second and third listed options (B and C) only, or the selection of all three options (A and B and C). This may be extended, as readily apparent by one of ordinary skill in this and related arts, for as many items listed.

Having described preferred embodiments of a method, system and computer program product for controlling lighting, it is noted that modifications and variations can be made by persons skilled in the art in light of the above teachings. It is therefore to be understood that changes may be made in the particular embodiments disclosed which are within the scope of the invention as outlined by the appended claims. Having thus described aspects of the invention, with the details and particularity required by the patent laws, what is claimed and desired protected by Letters Patent is set forth in the appended claims.

What is claimed is:

1. A lighting control system comprising:
   a first transceiver in a control device for IEEE 802 connection to a routed mesh network that connects a control device to at least one luminaire, wherein the routed mesh network is based on an IEEE 802 standard and includes a first WiFi connection of the control device to a router, a second WiFi connection of the router to a gateway, and a gate, and a gateway WiFi connection from the gateway to the at least one luminaire;
   a second transceiver based on Bluetooth radio frequency standard, a Bluetooth network including a first Bluetooth connection between the control device and the at least one luminaire, and a second Bluetooth connection between the control device and the gateway, the second transceiver collecting WiFi address information from the at least one luminaire and the gateway; and
   a data exchange application run from the control device for sharing address information for the gateway and the at least one luminaire including the WiFi address information between the routed mesh network and the Bluetooth network, wherein the address information is network address information that includes at least the gateway WiFi connection between the gateway and the at least one luminaire for the IEEE 802 connection of the routed mesh network through the first transceiver, the WiFi network address information obtained through the second transceiver by the first and second Bluetooth connections for establishing connectivity of luminaires in the at least one luminaire and the gateway in the routed mesh network.

2. The lighting control system of claim 1, wherein the routed mesh network based on the IEEE 802 standard is a Zigbee network.

3. The lighting control system of claim 1, wherein the Bluetooth network based on Bluetooth radio frequency standard is a Bluetooth BLE based network.

4. The lighting control system of claim 1, wherein the at least one luminaire has a light emitting diode light source.

5. The lighting control system of claim 1, wherein the control device is selected from the group consisting of a laptop/notebook computer, sub-notebook computer, a tablet, phablet computer; a mobile phone, a smartphone; a personal digital assistant (FDA), a portable media player (PMP) a cellular handset; a handheld gaming device; a gaming platform; a wearable computing device, a body-borne computing device, a smartwatch, smart glasses, smart headgear, and a combination thereof.

6. A method of setting up a lighting network comprising:
   providing a first network including a WIFI router and a gateway to provide for connection to a luminaire over a routed mesh network based on an IEEE 802 standard, the first network accessed by a first transceiver in a control device for the IEEE 802 connection to the routed mesh network that connects the control device to the luminaire, wherein the routed mesh network is based on the IEEE 802 standard and includes a first WiFi connection of the control device to the Wifi router, a second WiFi connection of the Wifi router to the gateway. and a gateway WiFi connection from the gateway to the luminaire;
   connecting the control device including a data exchange application and a Bluetooth based terminal to the luminaire and the gateway to receive IEEE 802 standard address information through the Bluetooth based terminal, and the IEEE 802 standard address information for the connection of the luminaire over the routed mesh network, wherein the Bluetooth based terminal includes a second transceiver based on Bluetooth radio frequency standard, the second transceiver in communication with a Bluetooth network including a first Bluetooth connection between the control device and the luminaire, and a second Bluetooth connection between the control device and the gateway, the second transceiver of the Bluetooth based terminal collecting the WiFi address information from the luminaire and the gateway; and
   employing the data exchange application to connect the control device using the IEEE 802 standard address information to the luminaire using the first network to provide a routed mesh network based on the IEEE 802 standard over the WIFI router and the gateway,. the data exchange application run from the control device sharing address information for the gateway and the luminaire including the IEEE 802 address information between the routed mesh network and the Bluetooth network, wherein the IEEE 802 address information is network address information that includes at least the gateway WiFi connection between the gateway and the luminaire for the IEEE 802 connection of the routed mesh network through the first transceiver, the IEEE 802 address information obtained through the second transceiver by the first and second Bluetooth connections for establishing connectivity of the luminaire and the gateway in the routed mesh network.

7. The method of claim 6, wherein the first transceiver for IEEE 802 standard based connection is a component of a Zigbee network.

8. The method of claim 6, wherein the second transceiver for connection for a Bluetooth based network connection utilizes a Bluetooth BLE standard connection.

9. The method of claim 6, wherein the control device is selected from the group consisting of a laptop/notebook computer, sub-notebook computer, a tablet, phablet computer; a mobile phone, a smartphone; a personal digital assistant (PDA), a portable media player (PMP), a cellular handset; a handheld gaming device; a gaming platform; a wearable computing device, a body-borne computing device, a smartwatch, smart glasses, smart headgear, and a combination thereof.

* * * * *